(12) United States Patent
Coyne et al.

(10) Patent No.: US 11,680,599 B2
(45) Date of Patent: Jun. 20, 2023

(54) LOCK NUT

(71) Applicant: Consolidated Metco, Inc., Vancouver, WA (US)

(72) Inventors: Brendan Coyne, Portland, OR (US); Logan M. Howell, Vancouver, WA (US); Joseph M. Shaw, Beavercreek, OR (US); Mary K. Marshall, Corvallis, OR (US); Michael Barden, Vancouver, WA (US); Jonathan Liao, Camas, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 739 days.

(21) Appl. No.: 16/723,587

(22) Filed: Dec. 20, 2019

(65) Prior Publication Data
US 2020/0200209 A1 Jun. 25, 2020

Related U.S. Application Data

(60) Provisional application No. 62/898,661, filed on Sep. 11, 2019, provisional application No. 62/783,476, filed on Dec. 21, 2018.

(51) Int. Cl.
*F16B 39/14* (2006.01)
*B60B 27/00* (2006.01)

(52) U.S. Cl.
CPC .............. *F16B 39/14* (2013.01); *B60B 27/00* (2013.01); *B60B 27/0078* (2013.01)

(58) Field of Classification Search
CPC .......... F16B 39/14; F16B 39/32; F16B 39/34; F16B 39/36; F16B 39/26; F16B 39/28;
(Continued)

(56) References Cited

U.S. PATENT DOCUMENTS

| 1,080,199 A | 12/1913 | Doolittle |
| 1,293,755 A | 2/1919 | Gorden |

(Continued)

FOREIGN PATENT DOCUMENTS

| CN | 102269210 A | 12/2011 |
| CN | 205349999 U | 6/2016 |

(Continued)

OTHER PUBLICATIONS

International Search Report and Written Opinion from International Application No. PCT/2019/068024 dated Apr. 27, 2020; 19 pages.
(Continued)

*Primary Examiner* — Daniel D Yabut
(74) *Attorney, Agent, or Firm* — Fitch, Even, Tabin & Flannery LLP

(57) ABSTRACT

In one aspect, a lock nut is provided that includes a washer, a threaded body, and an actuator that are distinct from one another. The washer is configured to form a non-rotatable connection with a vehicle spindle. The threaded body has threads to engage threads of the vehicle spindle. The actuator has a rotary drive structure and is configured to be turned in a tightening direction to cause turning of the threaded body in the tightening direction relative to the washer. The lock nut includes a lock operably coupled to the actuator and configured to inhibit turning of the threaded body in a loosening direction relative to the washer. The actuator is configured to be turned relative to the threaded body in the loosening direction to disengage the lock and permit turning of the threaded body in the loosening direction relative to the washer.

33 Claims, 35 Drawing Sheets

(58) Field of Classification Search
CPC .... F16B 39/282; F16B 39/284; F16B 39/286; F16B 23/0076; B60B 27/00
See application file for complete search history.

(56) References Cited

U.S. PATENT DOCUMENTS

| | | | |
|---|---|---|---|
| 1,639,974 A | 8/1927 | Cipriano, Jr. | |
| 4,812,094 A * | 3/1989 | Grube | F16B 39/10 |
| | | | 301/124.1 |
| 4,907,924 A | 3/1990 | Hellon | |
| 5,279,399 A | 1/1994 | Riggle | |
| 5,279,400 A | 1/1994 | Riggle | |
| 5,449,259 A * | 9/1995 | Clohessey | F16B 39/32 |
| | | | 411/262 |
| 5,533,794 A * | 7/1996 | Faison | B60B 27/00 |
| | | | 301/105.1 |
| 5,597,278 A * | 1/1997 | Peterkort | F16B 39/108 |
| | | | 411/134 |
| 5,732,596 A | 3/1998 | Erikson | |
| 7,389,579 B2 | 6/2008 | Rode | |
| 7,811,038 B2 | 10/2010 | Jimenez | |
| 7,992,456 B2 | 8/2011 | Schroeder | |
| 8,292,373 B2 | 10/2012 | Rieger | |
| 8,292,393 B2 | 10/2012 | Yoshida | |
| 8,403,611 B2 | 3/2013 | Friesen | |
| 8,961,090 B2 | 2/2015 | Rode | |
| 9,016,997 B2 | 4/2015 | Dooner | |
| 9,062,705 B2 | 6/2015 | Jimenez | |
| 9,200,673 B2 | 12/2015 | Rode | |
| 9,683,596 B2 | 6/2017 | Hughes | |
| 10,323,676 B2 | 6/2019 | Hughes | |
| 2003/0035699 A1 | 2/2003 | Harris | |
| 2004/0086354 A1 | 5/2004 | Harris | |
| 2008/0063489 A1 * | 3/2008 | Jimenez | F16B 39/32 |
| | | | 411/149 |
| 2009/0245969 A1 | 10/2009 | White | |
| 2011/0027041 A1 * | 2/2011 | Friesen | F16B 39/26 |
| | | | 411/313 |
| 2011/0316240 A1 | 12/2011 | Yang | |
| 2014/0348613 A1 | 11/2014 | Davis | |

FOREIGN PATENT DOCUMENTS

| | | |
|---|---|---|
| GB | 13369 | 6/1909 |
| GB | 181910 A | 6/1922 |
| GB | 237649 | 7/1925 |
| GB | 243469 | 12/1925 |
| GB | 440687 A | 1/1936 |
| WO | WO-2018090427 A1 * | 5/2018 |

OTHER PUBLICATIONS

Freewheel definition from Wikipedia printed from Wayback Machine https://web.archive.org/web/20180713004836/https://en.wikipedia.org/wiki/Freewheel; dated Jul. 13, 2018; 5 pages.
Renold Trapped Roller Clutch video from https://www.youtube.com/watch?v=QjR7dimpSJA, posted May 28, 2012; 8 pages.
Renold Sprag Clutch video from https://www.youtube.com/watch?v=Fsp3fm4KHs0, posted May 28, 2012; 7 pages.
Ratchet One Way Overrunning Clutch video from https://www.youtube.com/watch?v=gOuLq2haqLY, posted Nov. 14, 2017; 7 pages.
Chinese Office Action from related Chinese Patent Application No. 201980092869.4 dated Aug. 18, 2022; 9 pages.
European Extended Search Report from related European Patent Application No. 19901286.5 dated Oct. 13, 2022, 8 pages.

* cited by examiner

LOCK NUT

CROSS REFERENCE TO RELATED APPLICATIONS

This application claims the benefit of U.S. Provisional Patent Application No. 62/783,476 filed on Dec. 21, 2018, and U.S. Provisional Patent Application No. 62/898,661, filed Sep. 11, 2019, which are all hereby incorporated by reference in their entireties.

FIELD

This application relates to lock nuts and, more specifically, to lock nuts for wheel spindles.

BACKGROUND

A wheel hub assembly is mounted on the spindle of a vehicle axle to provide a rotatable mounting surface on which to mount a wheel. Wheel hub assemblies are provided in many different designs dependent upon the specific application for which the hub assembly is intended. Regardless of the hub assembly design, hub assemblies generally have the following components: wheel studs, driven axle studs, seals, inboard and outboard bearing such as tapered roller bearings, and a wheel hub to house these components. Depending upon the specifics of the design, wheel hub assemblies may also include an anti-lock brake ring and a spacer placed between the inboard and outboard tapered roller bearings. A spindle nut is threaded onto the spindle to affix the hub assembly onto the spindle. The spindle nut performs the function of axially retaining the hub assembly on the spindle while still allowing rotation of the hub.

Existing spindle nut configurations are shown, for example, in U.S. Pat. No. 8,292,393. One embodiment of the spindle nut disclosed in the '393 patent includes a lock ring and a washer that has holes corresponding to tabs on the lock ring. This configuration helps secure the spindle nut in position on the wheel end. However, the components of the spindle nut are installed on a spindle in several steps which may complicate installation of the spindle nut.

SUMMARY

In one aspect of the present disclosure, a lock nut is provided for a vehicle spindle. The lock nut includes a washer, a threaded body, and an actuator that are distinct from one another. The washer has an opening sized to receive the vehicle spindle and is configured to form a non-rotatable connection with the vehicle spindle. The threaded body has threads to engage threads of the vehicle spindle. The actuator has a rotary drive structure and is configured to be turned in a tightening direction to cause turning of the threaded body in the tightening direction relative to the washer. The lock nut further includes a lock operably coupled to the actuator and configured to inhibit turning of the threaded body in a loosening direction relative to the washer. The actuator is configured to be turned relative to the threaded body in the loosening direction to disengage the lock and permit turning of the threaded body in the loosening direction relative to the washer. In one embodiment, the lock nut provides a unitized assembly of the washer, threaded body, and actuator that may be readily threaded onto a vehicle spindle and tightened to a specified torque. Further, the lock of the lock nut inhibits loosening of the threaded body until a user turns the actuator to release the lock.

In another aspect of the present disclosure, a wheel hub assembly is provided that includes a wheel hub and bearings mounted in the wheel hub configured to receive a vehicle spindle. The wheel hub assembly includes a nut assembly comprising a threaded body and an actuator having a rotary drive structure. The actuator and threaded body have drive portions that cooperate to cause turning of the threaded body with turning of the actuator. The drive portions of the actuator and threaded body permit relative rotary movement of the actuator and the threaded body. The wheel hub assembly further includes a wheel end device coupled to at least one of the actuator and the threaded body. The wheel end device is configured to operate in response to the relative rotary movement of the actuator and the threaded body. In one embodiment, the nut assembly utilizes the turning of the actuator relative to the threaded body to operate the wheel end device. The wheel end device may operate immediately upon the rotary movement of the actuator and the threaded body or may operate after a delay such as a predetermined angular rotation of the actuator relative to the threaded body. The delay may be, for example, a relative angular displacement of the actuator and the threaded body in the range of approximately one to approximately ninety degrees, such as approximately one to approximately twenty degrees, such as approximately one to approximately ten degrees, such as approximately two to approximately eight degrees.

In an embodiment, the wheel end device includes a lock that is reconfigured between locked and unlocked configurations with relative rotary movement of the actuator and the threaded body. The lock may be, for example, a freewheel clutch. Alternatively or additionally, the wheel end device may include at least one sensor configured to detect the relative rotary movement of the actuator and the threaded body. The wheel end device may include a processor coupled to the at least one sensor and configured to generate a signal in response to the at least one sensor detecting the relative rotary movement of the actuator and the threaded body. The processor may cause communication circuitry of the wheel end device to wirelessly communicate the signal to a remote device. The signal may be used by the remote device to, for example, determine that the wheel hub assembly has been placed into service and/or has been serviced by a technician.

The present disclosure also provides a method of operating a lock nut. The lock nut includes a washer non-rotatably connected to a vehicle spindle, a threaded body having threads engaged with threads of the spindle, and an actuator configured to be turned in a loosening direction relative to the threaded body to disengage a lock of the lock nut that inhibits turning of the threaded body in a loosening direction relative to the washer. The method includes connecting a tool to a rotary drive structure of the actuator and turning the actuator in a tightening direction to cause turning of the threaded body in the tightening direction relative to the washer. In one embodiment, the method permits the lock nut to be mounted to a spindle to secure a wheel hub thereon, the lock nut having an actuator that may be turned in the loosening direction to release the lock nut and permit turning of the threaded body in the loosening direction to remove the lock nut from the spindle if desired by the user.

In another aspect, the present disclosure provides a fastener assembly including a rotary engagement member having a central through opening to receive a shaft and an actuator connected to the rotary engagement member and having a rotary drive structure. The actuator and rotary engagement member include drive portions that cooperate to cause turning of the rotary engagement member with turning of the actuator. The drive portions of the actuator and rotary engagement member permit relative rotary movement of the actuator and the rotary engagement member. The fastener assembly further includes a fastener device coupled to at least one of the actuator and the rotary engagement member, the fastener device configured to operate in response to the relative rotary movement of the actuator and the rotary engagement member. In one embodiment, the fastener device performs an operation upon the turning of the actuator relative to the rotary engagement member. The fastener device may operate immediately upon the relative rotary movement or may operate after a delay such as the actuator and the rotary engagement member turning relative to one another through a predetermined range of rotational movement.

The fastener device may include, for example, a lock that shifts between locked and unlocked configuration with relative rotary movement of the actuator and the rotary engagement member. As another example, the fastener device includes a sensor configured to detect relative rotary movement of the actuator and the rotary engagement member. The fastener device further includes a processor coupled to the sensor and configured to generate a signal indicating the rotary movement. The fastener device may also include communication circuitry that wirelessly communicates the signal to a remote device such as a user device or a vehicle device.

DETAILED DESCRIPTION

Figure 1:
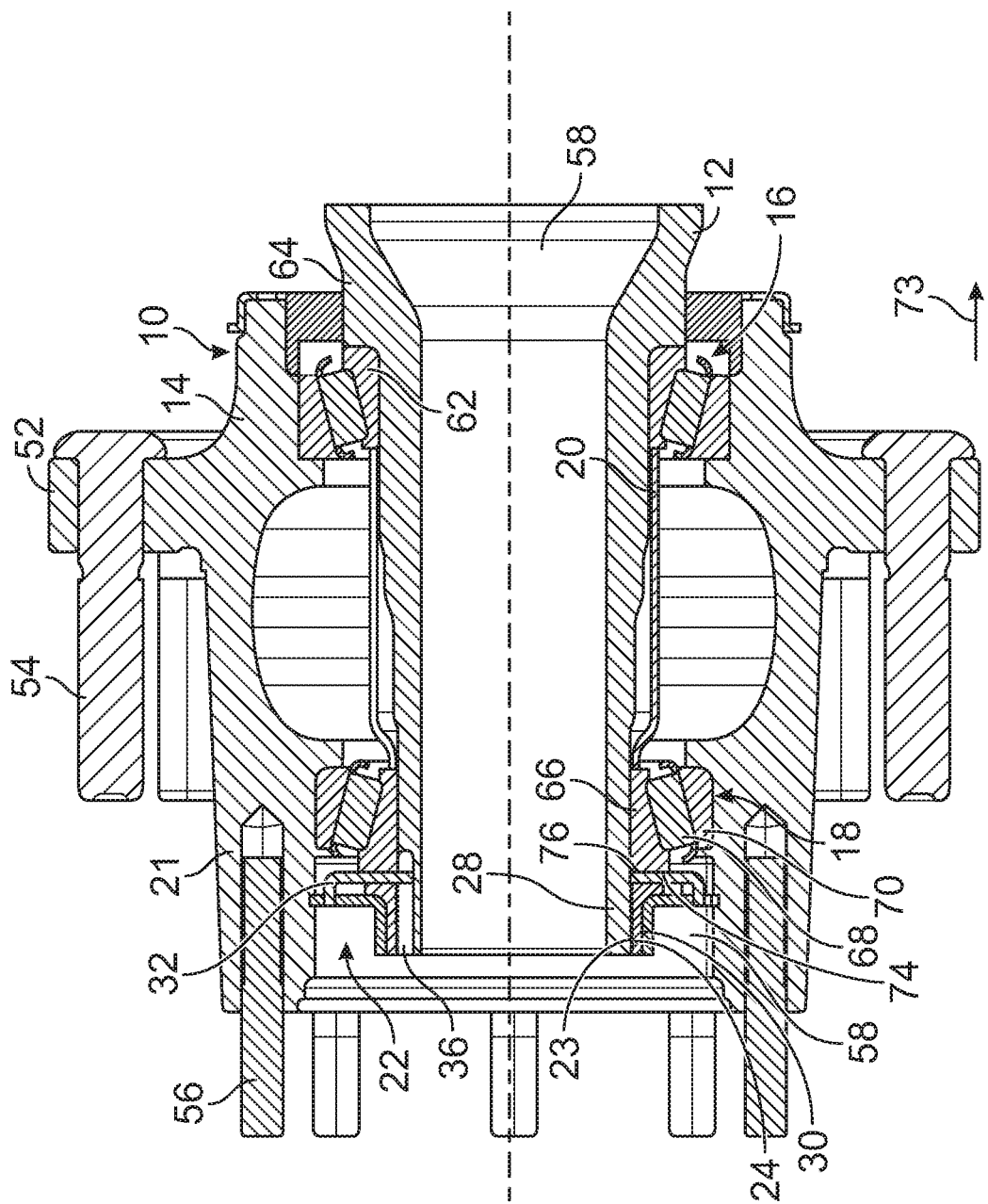
FIG. 1 is a cross-sectional view of a lock nut retaining a wheel hub on a spindle of a vehicle.

Regarding FIG. 1, a wheel hub assembly 10 is shown mounted to a spindle 12 of a vehicle. The wheel hub assembly 10 includes a wheel hub 14 having one or more bearing assemblies 16, 18 that receive the spindle 12, a spacer 20 maintaining an axial separation between the bearing assemblies 16, 18, and a hub body 21. The wheel hub assembly 10 further includes a fastening apparatus, such as a lock nut 22 that engages threads 23 of a distal end portion 28 of the spindle 12, to retain the wheel hub 14 on the spindle 12.

Figure 2:
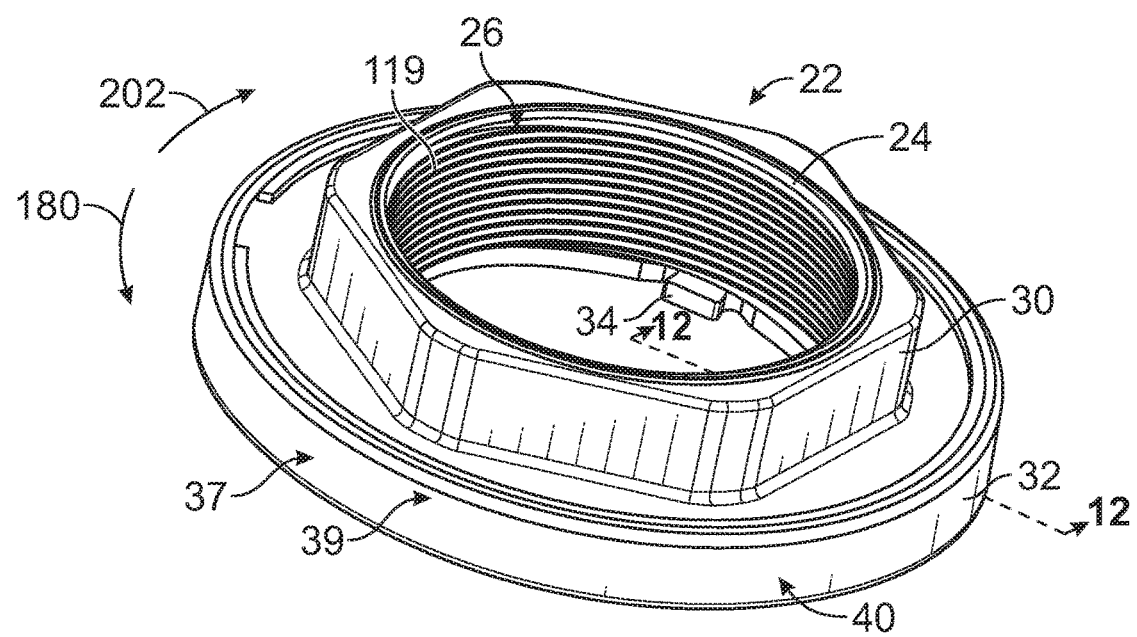
FIG. 2 is a perspective view of the lock nut of FIG. 1 showing a central opening of a threaded body of the lock nut that receives the spindle.

Regarding FIGS. 1 and 2, the lock nut 22 includes a unitized assembly of distinct components that permit the lock nut 22 to be readily threaded onto the spindle 12 and inhibits unintentional loosening of the lock nut 22 such as due to vibration of the spindle 12. The lock nut 22 may be a single assembly without any loose parts. The lock nut 22 may thereby have a one-step assembly onto the spindle 12; specifically, the user threads the lock nut 22 onto the spindle 12 and tightens the lock nut 22 to a specified torque. The one-step assembly makes the lock nut 22 more intuitive for a user because, from the user's perspective, the lock nut 22 is threaded onto the spindle in a manner similar to a conventional nut.

Regarding FIG. 2, in one embodiment the lock nut 22 includes a rotary engagement member, such as a threaded body 24, having a through opening 26 that receives the spindle 12, an actuator such as a nut head 30, and a nut base such as a washer 32. The washer 32 has a key, such as a tang 34, that is received in a keyway 36 of the distal end portion 28 of the spindle 12 to inhibit turning of the washer 32 relative to the spindle 12. Other key configurations may be utilized to inhibit turning of the washer 32 relative to the spindle 12.

The washer 32 is rotatably coupled to the threaded body 24 and may be positioned on the spindle 12 with the tang 34 aligned with the keyway 36. A user connects a driving tool to the nut head 30 and turns the nut head 30 in a clockwise tightening direction 202 (see FIG. 13) which causes the nut head 30 to turn in the tightening direction 202 and advances the nut head 30, threaded body 24, and washer 32 together in an inboard direction. The threaded body 24 turning in the tightening direction 202 shifts the washer 32 axially inboard along the spindle 12 without rotation due to the engagement between the tang 34 and keyway 36. The user applies torque to the nut head 30 until a particular torque is reached.

The lock nut 22 has a lock 37 such as a one-way lock that permits tightening of the threaded body 24 on the spindle 12 while inhibiting loosening of the threaded body 24 on the spindle 12. In one embodiment, the lock 37 includes a roller clutch 39 having a locked configuration wherein roller locks 40 of the roller clutch 39 permit the threaded body 24 to turn in the tightening direction 202 relative to the washer 32 and inhibit the threaded body 24 from turning in a counterclockwise loosening direction 180 (see FIG. 13) relative to the washer 32. Once the user has stopped applying torque to the nut head 30 in tightening direction 202 using the driving tool, the roller clutch 39 automatically locks the threaded body 24 relative to the washer 32 to inhibit loosening of the threaded body 24.

Figure 13:
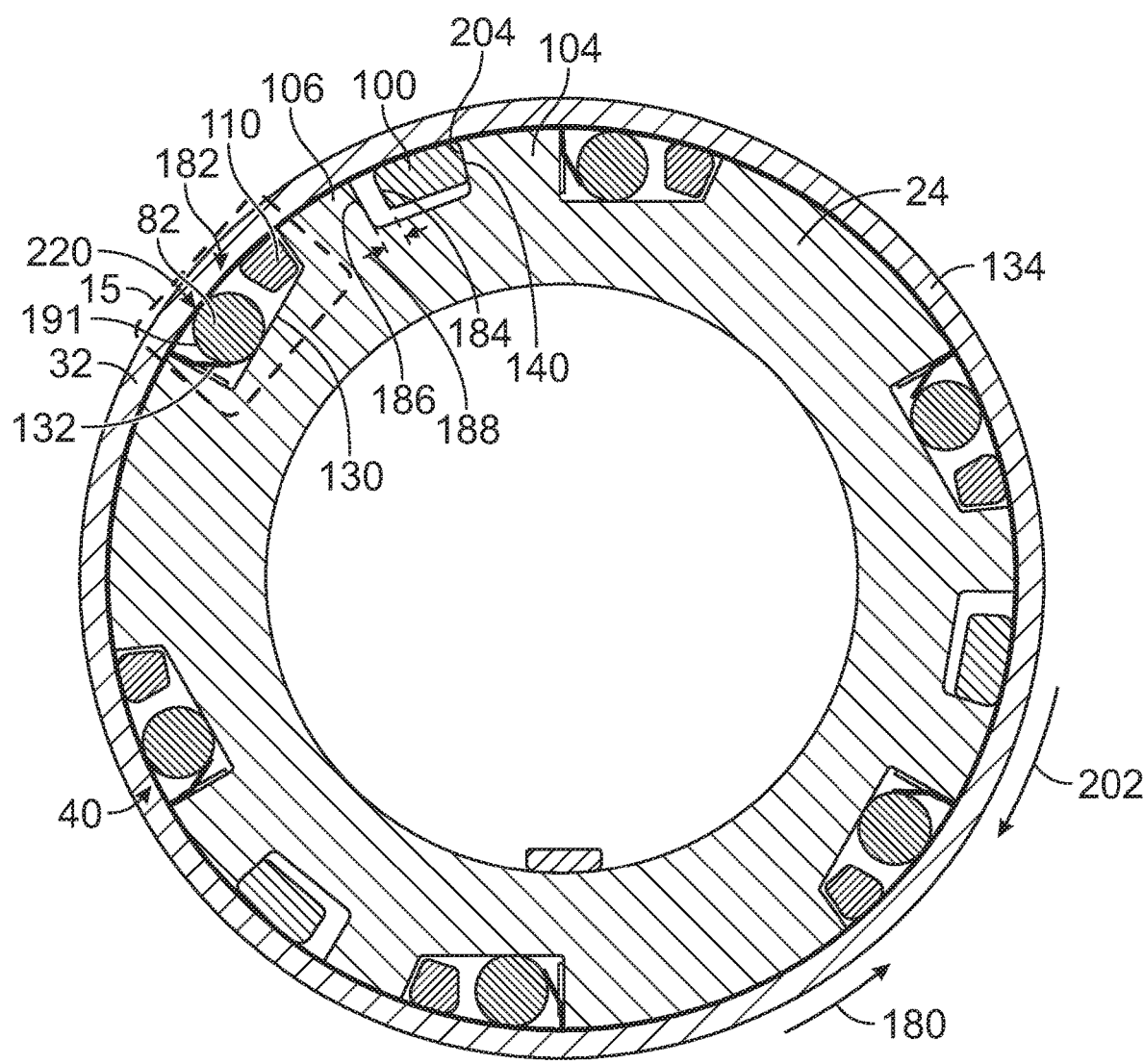
FIG. 13 is a cross-sectional view taken across line 13-13 in FIG. 3 showing roller locks of the lock nut in a locked configuration that inhibit turning of the threaded body relative to the washer in a counterclockwise loosening direction.
Figure 14:
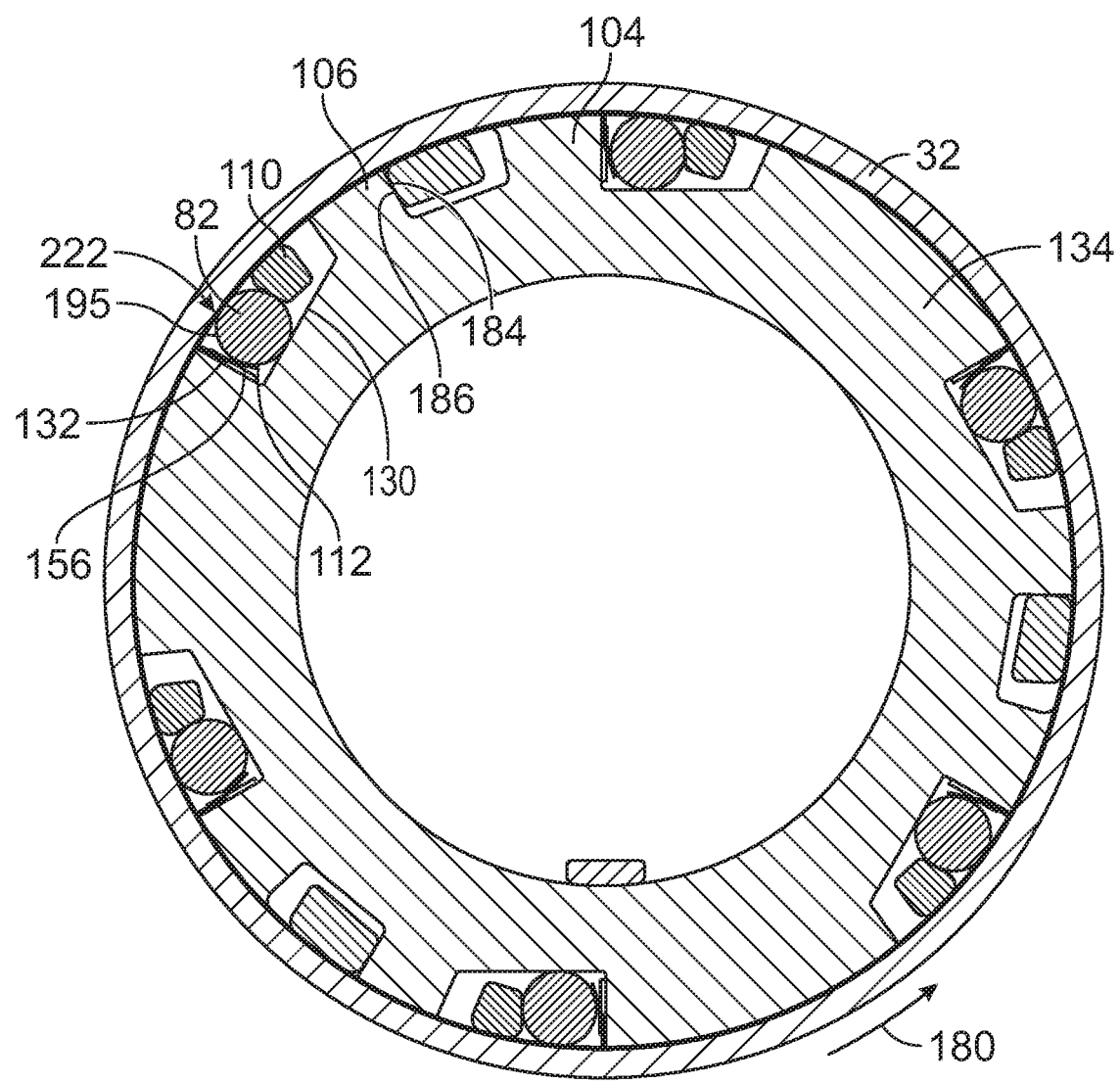
FIG. 14 is a cross-sectional view similar to FIG. 13 showing the nut head turned in the counterclockwise loosening direction so that the actuating tabs thereof shift the roller locks from the locked configuration to an unlocked configuration that permits turning of the threaded body in the counterclockwise loosening direction relative to the washer.

To remove the lock nut 22 from the spindle 12, the user connects the driving tool to the nut head 30 and turns the nut head 30 in the loosening direction 180 which causes the nut head 30 to turn or rotate relative to the threaded body 24 in loosening direction 180 a predetermined angular distance as shown by comparing FIGS. 13 and 14. The turning of the nut head 30 relative to the threaded body 24 in the loosening direction 180 first causes the roller locks 40 to shift to an unlocked configuration, which permits loosening of the threaded body 24, and second causes the nut head 30 to turn the threaded body 24 in the loosening direction 180. In this manner, the roller clutch 39 causes the unlocking of the roller locks 40 prior to the nut head 30 turning the threaded body 24 in the loosening direction 24.

Vibrations or impacts to the lock nut 22 are insufficient to reconfigure the roller locks 40 from the locked configuration to the unlocked configuration. Rather, the nut head 30 is turned to reconfigure the roller locks 40 from the locked to the unlocked configuration. In this manner, the lock nut 22 inhibits unintentional loosening of the lock nut 22 from the spindle 12 and thereby retains the wheel hub 14 on the spindle 12.

The lock 37 of the lock nut 22 may take a variety of forms. For example, the lock 37 may include a clutch such as a freewheel clutch. The lock 37 may include a ratchet clutch like the ratchet clutch shown in FIGS. 34 and 35. As another example, the lock 37 of the nut 22 may include a sprag clutch.

Regarding FIG. 1, the hub body 21 is rotatable on the spindle 12 around an axis 50 and includes a flange 52 with studs 54 for mounting a wheel thereto. The hub body 21 further includes studs 56 that receive a hub cap to close an opening 58 of the wheel hub 14. In another embodiment, a drive axle may extend through an interior 58 of the spindle 12 with a drive flange of the drive axle being secured to the studs 56. The drive axle may thereby turn the wheel hub 14 and cause rotation of the associated wheel. The bearing assembly 16 includes a bearing ring, such as a cone 62, that is pressed against a shoulder 64 of the spindle 12 with tightening of the lock nut 22 on the spindle threads 23. The spacer 20 maintains an axial separation between the cone 62 of the bearing assembly 16 and a cone 66 of the bearing assembly 18. The bearing assembly 18 includes a plurality of bearings, such as roller bearings 68, and a bearing ring, such as a cup 70. The bearings 16, 18 may be mirror images of one another. The washer 32 has an inboard surface 74 that presses against an outboard surface 76 of the cone 66 with tightening of the lock nut 22 onto the spindle threads 23. In this manner, tightening lock nut 22 onto the spindle 12 in inboard direction 73 clamps the cone 66, spacer 20, and cone 62 between the washer 32 and the shoulder 64.

Figure 3:
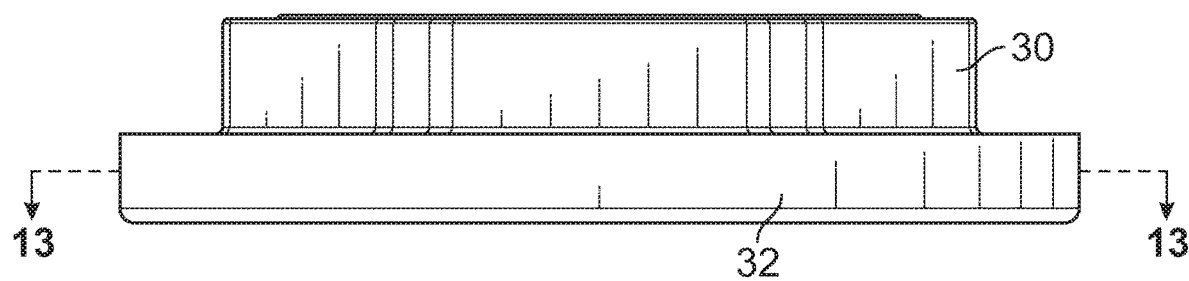
FIG. 3 is a side elevational view of the lock nut of FIG. 2 showing an upper nut head that receives a driving tool and a lower washer that non-rotatably connects to the spindle.
Figure 4:
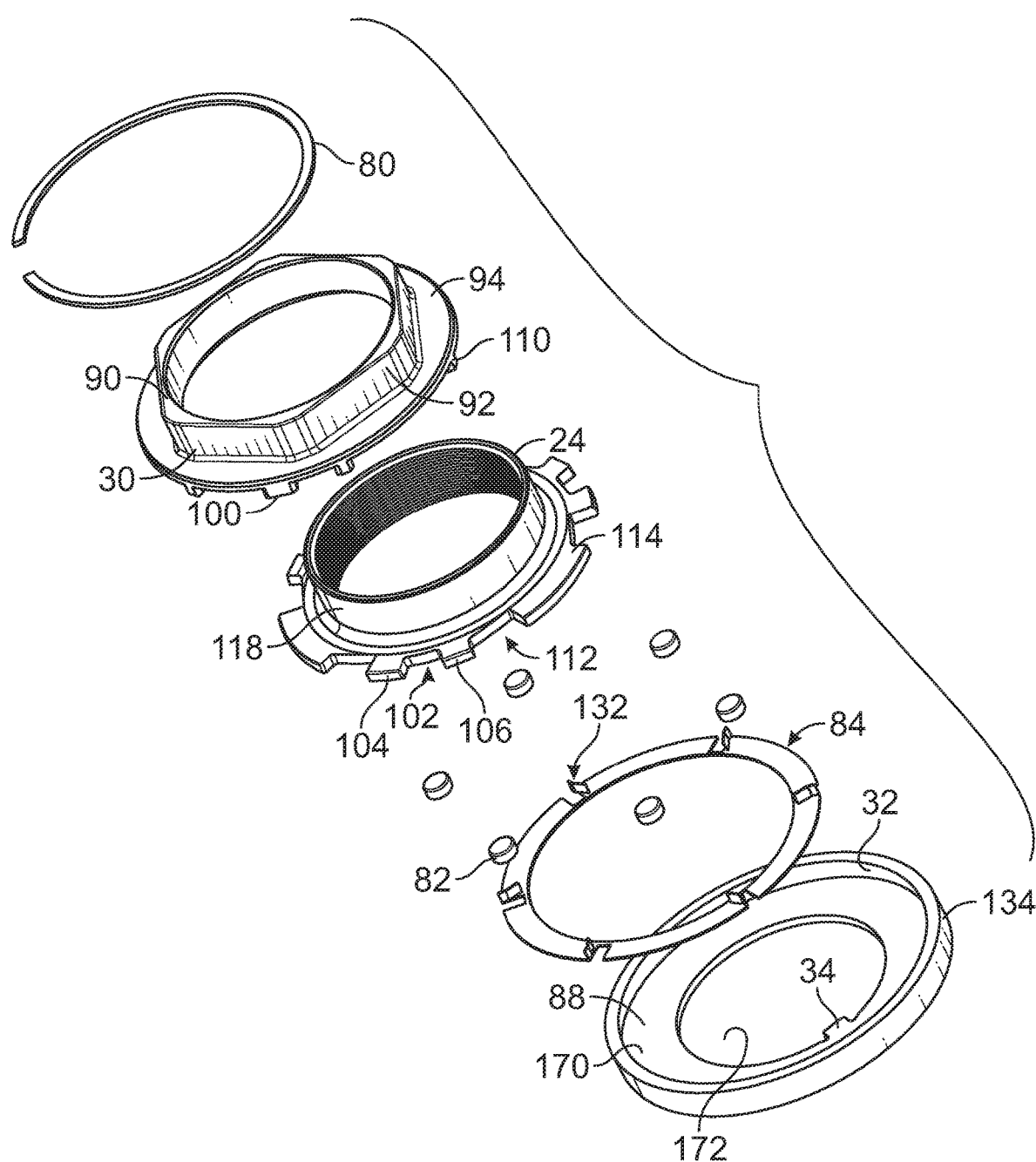
FIG. 4 is an exploded view of the lock nut of FIG. 2 showing a retaining ring, the nut head, the threaded body, rollers, a spring ring, and the washer.

Regarding FIGS. 3 and 4, the lock nut 22 includes a retainer, such as a retaining ring 80, that maintains the nut head 30, threaded body 24, one or more locking members such as clamping elements like rollers 82, and a spring support such as a spring ring 84, assembled with the washer 32. The spring ring 84 provides various operability for the lock nut 22, including returning the roller locks 40 to locked configurations once a user stops applying torque to the nut head 30 with the driver tool. The retaining ring 80 may be a resilient, split ring that may be compressed radially inward to permit the retaining ring 80 to be positioned within a groove 86 (see FIG. 12) of the washer 32 and captures portions of the nut head 30, threaded body 24, the rollers 82, and the spring ring 84 at least partially in a compartment 88 of the washer 32.

Figure 5:
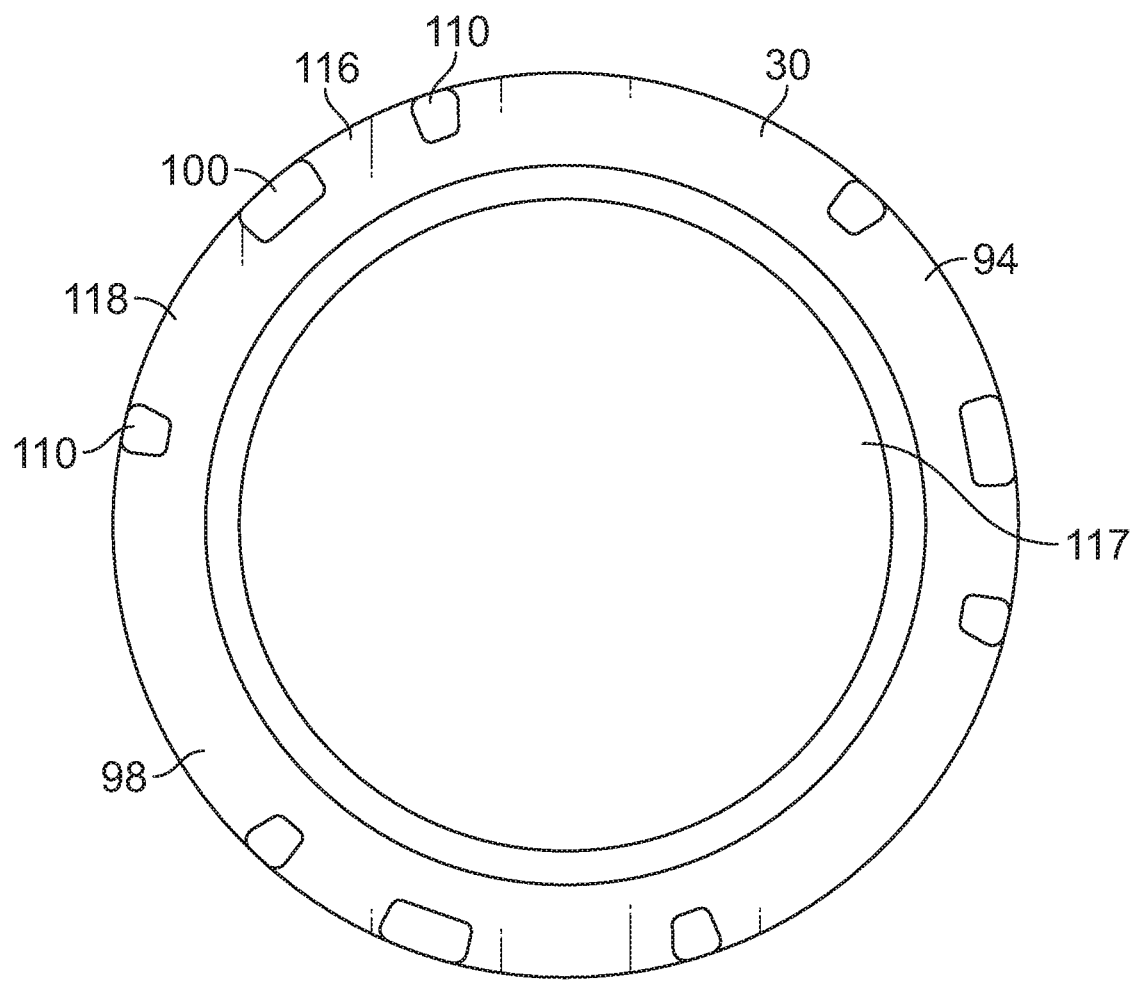
FIG. 5 is a bottom plan view of the nut head of FIG. 4 showing driving tabs and actuating tabs circumferentially spaced around the nut head.
Figure 6:
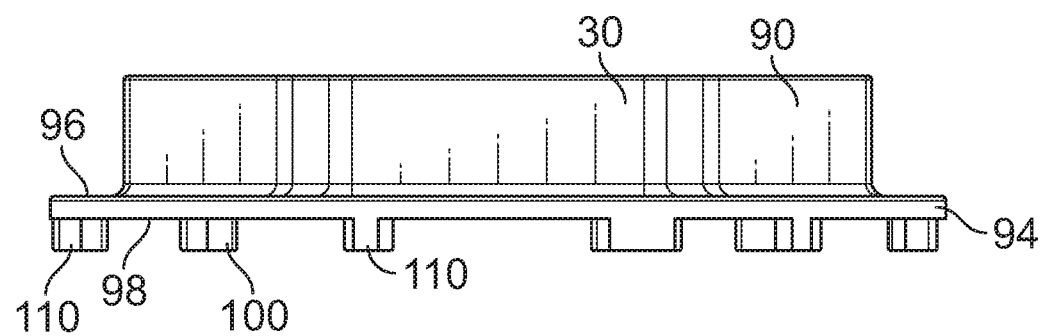
FIG. 6 is a side elevational view of the nut head of FIG. 5 showing the driving tabs and actuating tabs depending from a flange portion of the nut head.

Regarding FIGS. 4 and 5, the nut head 30 includes a tool-receiving portion, such as a rotary drive structure 90 having one or more walls 92. The rotary drive structure 90 is configured to receiving a driving tool, such as a torque wrench. In one embodiment, the rotary drive portion 90 has a hex nut configuration. The nut head 30 further includes a flange 94 with an upper surface 96 and a lower surface 98. The nut head 30 has one or more drive portions, such as driving tabs 100, that extend into drive openings 102 (see FIG. 4) of the threaded body 24 and the threaded body 24 has drive portions, such as flange portions 104, 106, adjacent each driving tab 100. The driving tabs 100 are configured to contact the flange portions 104 with turning of the nut head 30 in tightening direction 202 and urge the threaded body 24 in tightening direction 202. Likewise, the driving tabs 100 are configured to contact the flange portions 106 with turning of the nut head 30 in loosening direction 180 and urge the threaded body 24 in loosening direction 180.

Regarding FIGS. 4 and 5, the nut head 30 further includes one or more actuating portions, such as actuating tabs 110, configured to contact the rollers 82 with turning of the nut head 30 in the loosening direction 180 and shift the rollers 82 from a locked position to an unlocked position. With the rollers 82 in the unlocked positions thereof, the rollers 82 are disengaged from the washer 32 and the driving tabs 100 of the nut head 30 may turn the threaded body 24 in the loosening direction 180 with the nut head 30.

Figure 7:
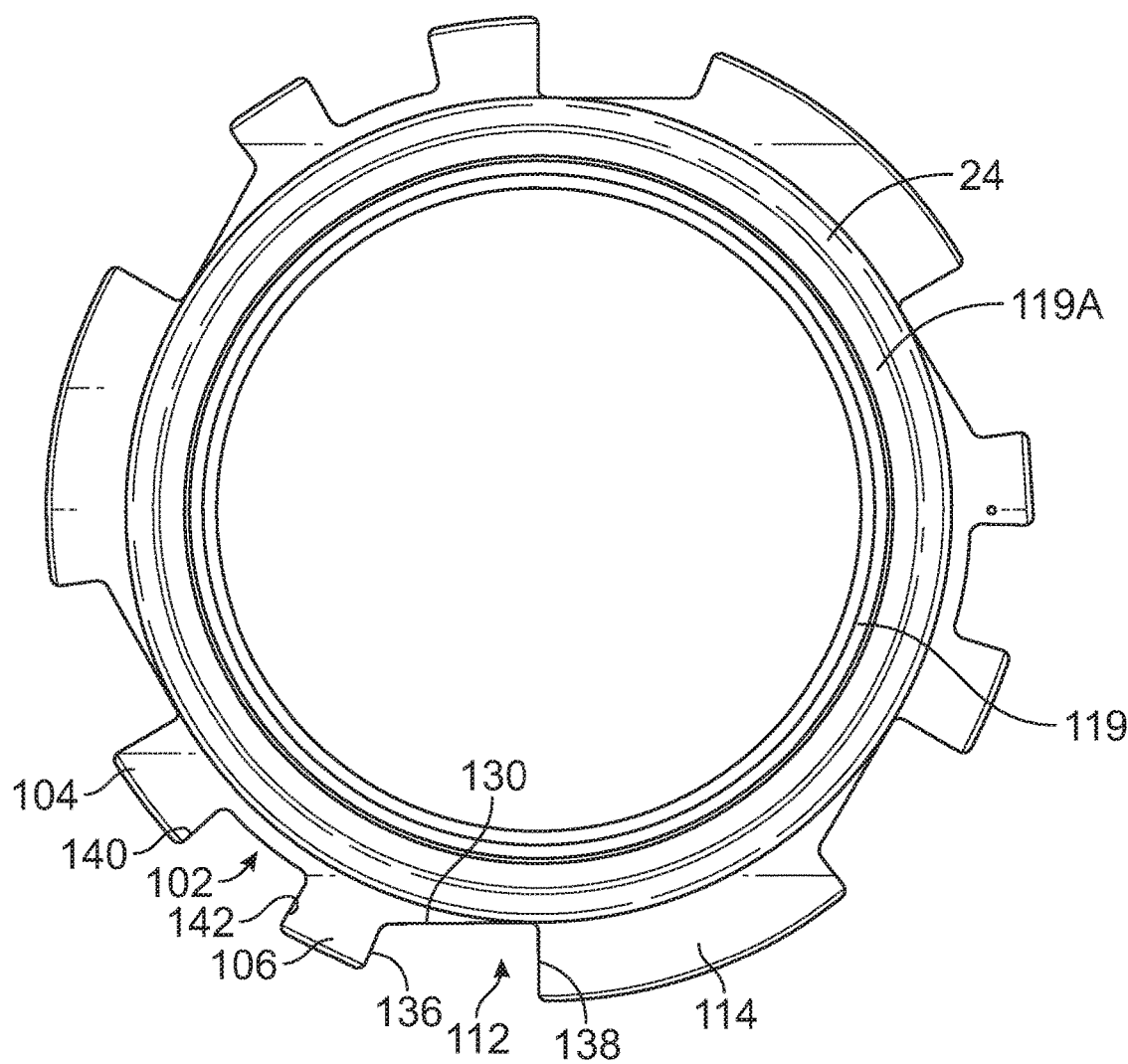
FIG. 7 is a top plan view of the threaded body of FIG. 4 showing circumferentially spaced openings of the threaded body that receive the driving and actuating tabs of the nut head of FIG. 5.
Figure 8:
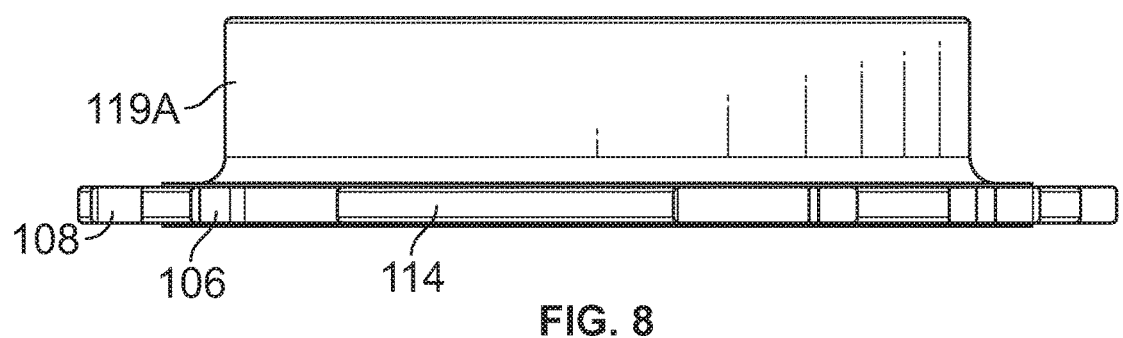
FIG. 8 is a side elevational view of the threaded body of FIG. 7 showing a riser of the threaded body upstanding from a flange of the threaded body.

Regarding FIGS. 5 and 7, the actuating tabs 110 of the nut head 30 extend into ramp openings 112 of the threaded body 24 between the flange portion 106 and a flange portion 114 of the threaded body 24. Each driving tab 110 is separated from nearby actuating tabs 110 by circumferential gaps 116, 118. The nut head 30 includes a central opening 117 sized to receive a riser portion 119A (see FIG. 8) of the threaded body 24.

Regarding FIGS. 4 and 7, each ramp opening 112 of the threaded body 24 includes a ramp surface 130 and the spring ring 84 includes an associated biasing member that urges the roller 82 in the ramp opening 112 against the ramp surface 130. In one embodiment, the biasing member includes a spring such as a spring tab 132. Regarding FIG. 13, the spring tabs 132 urge the rollers 82 along the ramp surface 130 in tightening direction 202 to wedge the rollers 82 between the ramp surfaces 130 of the threaded body 24 and an annular wall 134 of the washer 32 as discussed in greater detail below. The rollers 82 are made of a rigid material, such as a metallic material such as steel, and resist compressive loading from the threaded body 24 and washer 32 that results when the threaded body 24 is urged in loosening direction 180 such as due to vibration.

Regarding FIG. 7, the angle of the ramp surface 130 forms a radially shorter surface 136 at one circumferential end of the ramp opening 112 and a longer surface 138 at an opposite circumferential end of the ramp opening 112. Further, the flange portions 104, 106 have stop surfaces 140, 142 that are contacted by an associated driving tab 100 to cause turning of the threaded body 24 with turning of the nut head 30.

Figure 9:
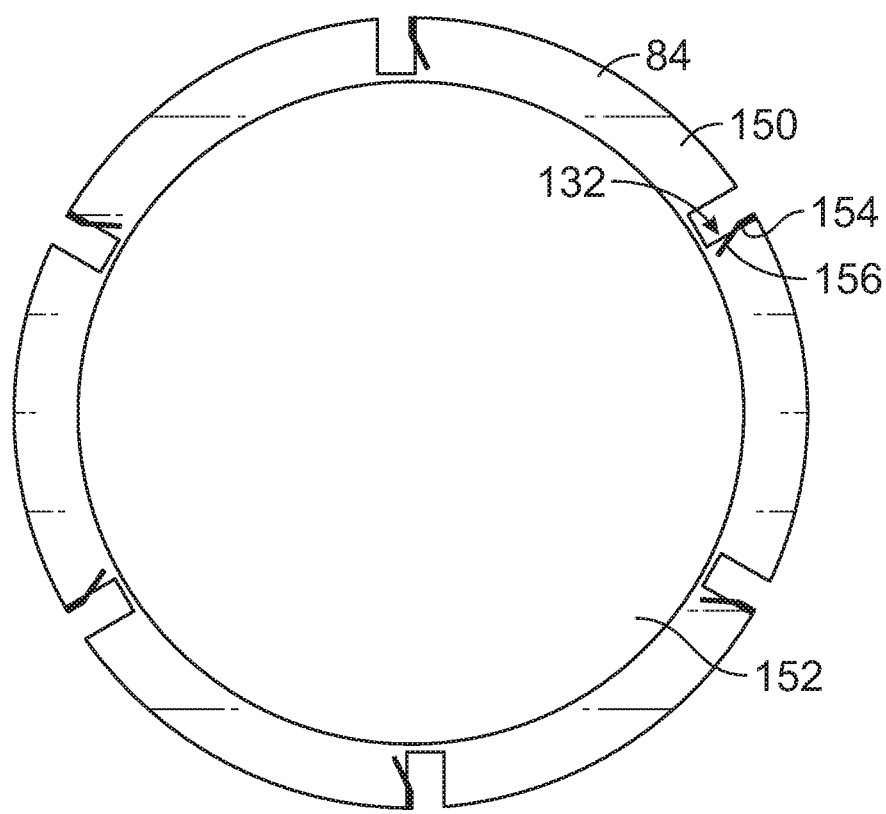
FIG. 9 is a top plan view of the spring ring of FIG. 4 showing spring tabs spaced circumferentially around the spring ring.

Regarding FIG. 9, the spring ring 84 has a body portion 150 extending around a central opening 152. The spring tabs 132 each include a base portion 154 upstanding from the body portion 150 and a pivotal, resilient arm portion 156. The spring tabs 132 may be formed by forming a J-shaped opening in the body portion 150 and bending a portion of the material of the spring ring 84 out of the plane of the body portion 150 to form the base portion 154. When the lock nut 22 is assembled, the base portion 154 extends upward into the ramp opening 112 of the threaded body 24 from below the flange portion 114 while the actuating tab 110 of the nut head 30 extends downward into the ramp opening 112 from above the flange portion 114.

In one embodiment, the spring tabs 132 have a unitary, one-piece construction with the rest of the spring ring 84. The threaded body 24, nut head 30, and washer 72 may each have a unitary, one-piece construction. In other embodiments, the threaded body 24, nut head 30, washer 32, and/or spring ring 84 may each be an assembly of parts joined together such as by welding.

Figure 10:
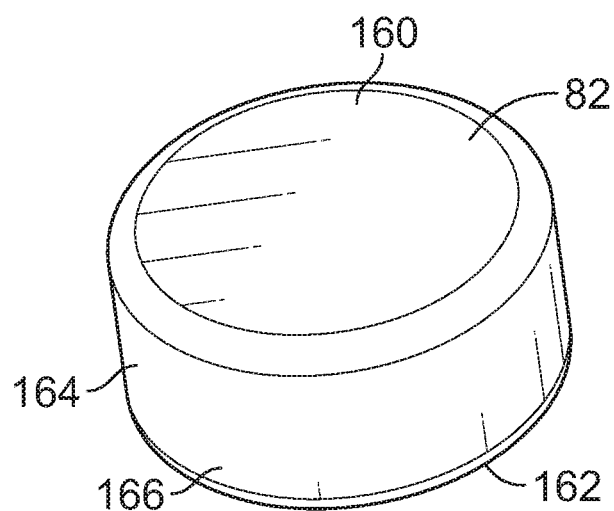
FIG. 10 is a perspective view of one of the rollers of FIG. 4 showing a flat upper surface and a curved side surface of the roller.

Regarding FIG. 10, the roller 82 has a flat upper surface 160, a flat lower surface 162, and a side wall 164 extending therebetween. The side wall 164 has a curved surface 166 that is configured to roll or slide along the annular wall 134 of the washer 52. In another embodiment, the rollers 82 may include ball rollers.

Figure 11:
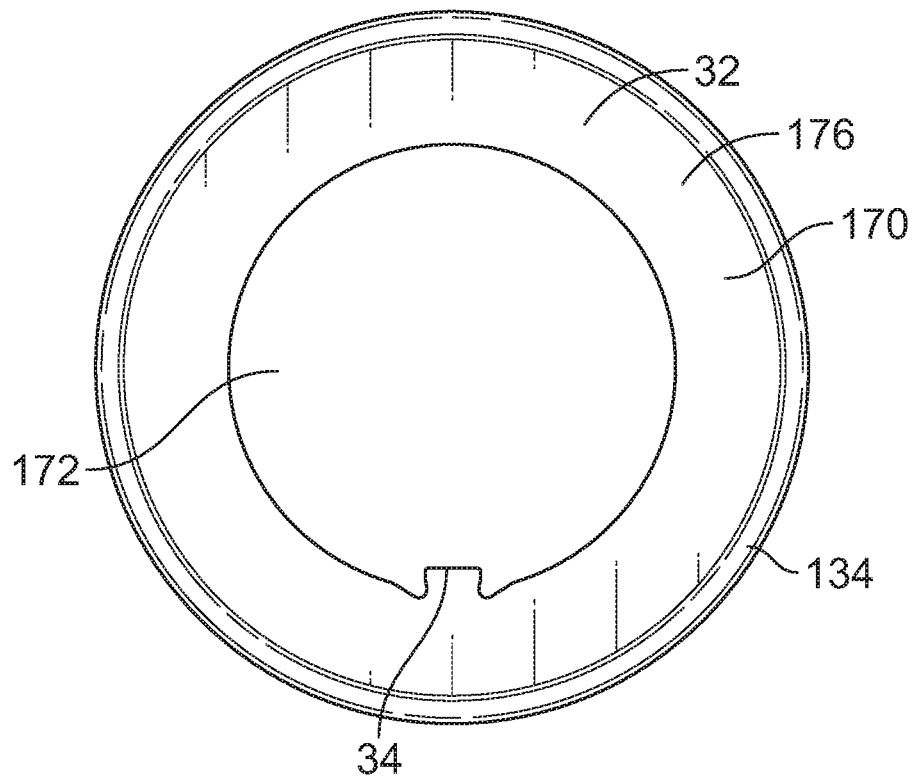
FIG. 11 is a top plan view of the washer of FIG. 4 showing a tang extending radially inward that engages a keyway of the spindle to inhibit turning of the washer relative to the spindle.
Figure 12:
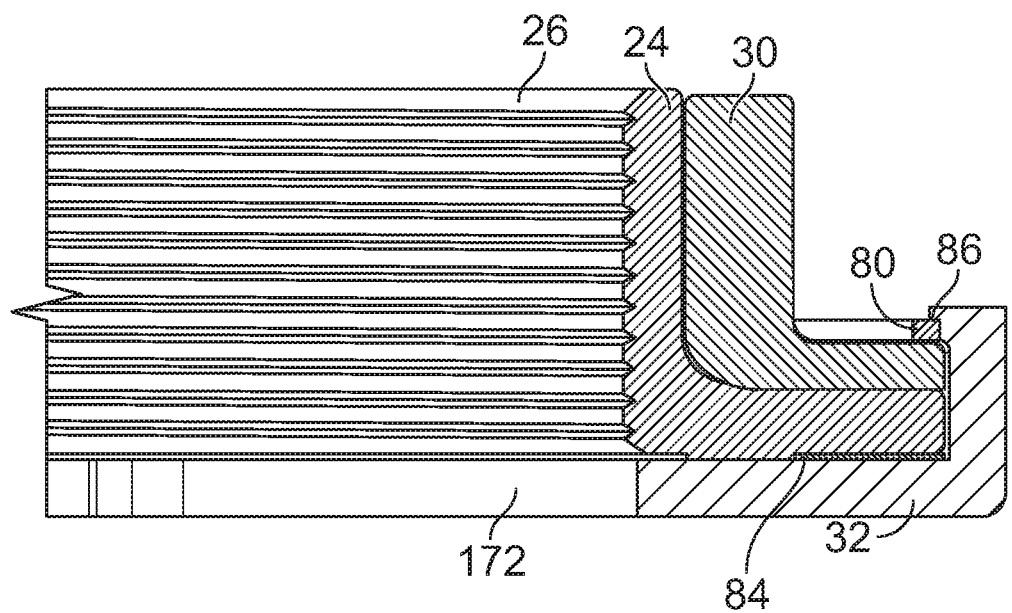
FIG. 12 is a cross-sectional view taken across line 12-12 in FIG. 2 showing the retaining ring capturing a nut head flange, a threaded body flange, and the spring ring in a compartment of the washer.

Regarding FIG. 11, the washer 32 includes a collar portion 170 extending about a central opening 172 and the annular wall 134 is upstanding from the collar portion 170. The tang 34 extends radially inward from the collar portion 170 to extend into the keyway 36 of the spindle 12. The lateral sides of the tang 34 contact lateral walls of the keyway 36 and resist turning of the washer 32 around the spindle 12. The collar portion 170 of the washer 32 has an upper surface 176 for supporting the spring ring 84 and the threaded body 24 thereon as shown in FIG. 12.

Regarding FIG. 13, the roller locks 40 are shown in a locked configuration whereby the rollers 82 rigidly inhibit turning of the threaded body in counterclockwise loosening direction 180. The roller locks 40 form a freewheel roller clutch 182 that includes the washer 32 as an outer race, the threaded body 24 as an inner race, and the rollers 82 as clamping elements. The driving tabs 100 of the nut head 30 and the flange portions 104 cooperate to permit turning of the threaded body 24 in tightening direction 202 to cause corresponding freewheeling or rotation of the threaded body 24 in the tightening direction 202.

Figure 15:
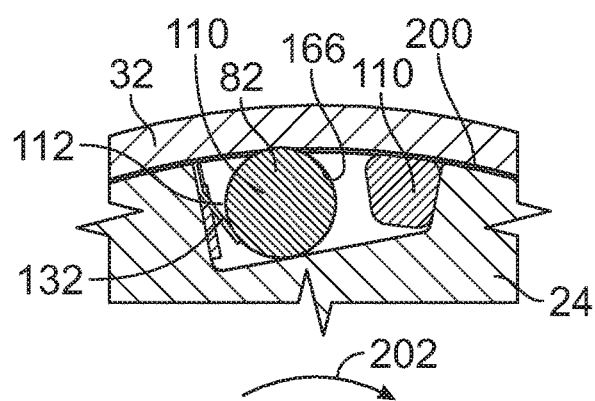
FIG. 15 is an enlarged view of the dashed area in FIG. 13.
Figure 16:
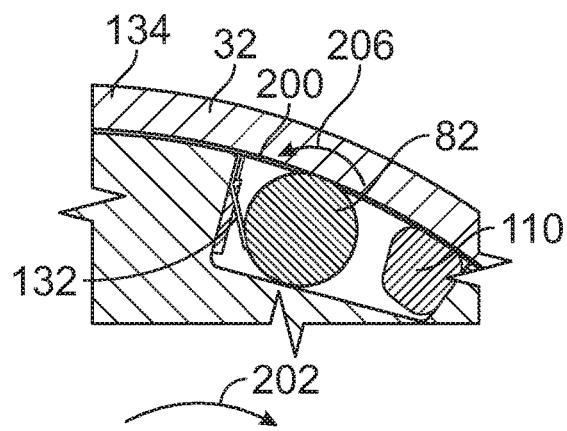
FIG. 16 is a view similar to FIG. 15 showing turning of the nut head in the clockwise tightening direction causing an actuating tab of the nut head and one of the rollers to travel in a pocket of the threaded body along an annular wall of the washer.

Regarding FIG. 15, the roller 82, the actuating tab 110, and the spring tab 132 are received in the ramp opening 112 of the threaded body 24. The surface 166 of the roller 82 is positioned in contact with a radially inner surface 200 of the annular wall 134 of the washer 32. When the nut head 30 is turned in the tightening direction 202, the driving tabs 100 of the nut head 30 have surfaces 204 (see FIG. 13) that contact surfaces 140 of the flange portions 104 of the threaded body 24 and urge the threaded body 24 in direction 202. The spring tab 132 keeps the roller 82 in contact with or closely adjacent the annular wall 134 so that the surface 166 of the roller 82 slides or rolls in direction 206 along the radially inner surface 200 of the annular wall 134 as shown in FIG. 16. The rollers 82 float in the ramp opening 112 vertically between the flange 94 and the collar portion 88 and horizontally between the threaded body 24 and the annular wall 134 as the threaded body freewheels in tightening direction 202.

Figure 17:
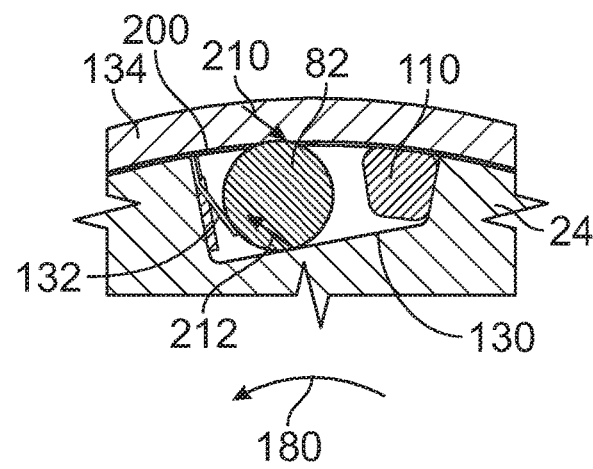
FIG. 17 is a view similar to FIG. 15 showing the roller being wedged between the annular wall of the washer and a ramp surface of the threaded body to inhibit turning of the threaded body in the counterclockwise loosening direction.

Regarding FIG. 17, the roller 82 is shown in a locked position such as after a user disconnects a wrench from the nut head 30. Urging of the threaded body 24 in the loosening direction 180, such as due to vibration, forces or wedges the roller 82 between the radially inner surface 200 of the annular wall 134 of the washer 32 and the ramp surface 130 of the threaded body 24. The threaded body 24 and washer 32 thereby clamp side portions of the roller 82 in directions 210, 212. The rollers 82 are made of a rigid material that resists the clamping force such that the roller 82 inhibit turning of the threaded body 24 in loosening direction 180.

The rotatable connection between the nut head 30 permits a predetermined range of rotational movement between the nut head 30 and the threaded body 24, such as one to eight degrees, such as two to five degrees, when the nut head 30 is turned in the loosening direction 180. For example, the spring ring 84 may return the nut head 30 and threaded body 24 to an initial configuration after torque has been applied to the nut head 30 by a tool. When the tool is subsequently turned in the tightening direction 202, the nut head 32 may turn relative to the threaded body 24 a predetermined amount, such as one degree, before the driving flanges 100 abut the flange portions 104 and start to turn the threaded body 24.

Turning the nut head 30 in loosening direction 180 turns the nut head 30 relative to the threaded body 24 and brings the actuating tabs 110 into contact with the rollers 82 to shift the rollers 82 to unlocked positions. The shifting of the rollers 82 may begin immediately upon the nut head 30 turning in loosening direction 180 relative to the threaded body 24, or there may be an angular delay before the actuating tabs 110 start shifting the rollers 82 to unlocked positions.

More specifically and with reference to FIGS. 13 and 14, as the nut head 30 is turned in the loosening direction 180, surfaces 184 of the driving tabs 100 shift into abutting contact with the surface 186 of the flange portions 106 of the threaded body 24 as shown in FIG. 14. Therefore, a take-up distance 188 between surfaces 184, 186 permits a predetermined range of angular rotation of the nut head 30 relative to the threaded body 24 in the loosening direction 180. Prior to the surfaces 184, 186 abutting, the actuating tabs 110 contact the rollers 82 and shift the rollers 82 to unlocked positions which unlocks the freewheel roller clutch 182. The rollers 82 are therefore shifting toward or at the unlocked positions thereof before the surfaces 184, 186 abut and transfer turning of the nut head 30 in loosening direction 180 into turning of the threaded body 24 in loosening direction 180.

Figure 18:
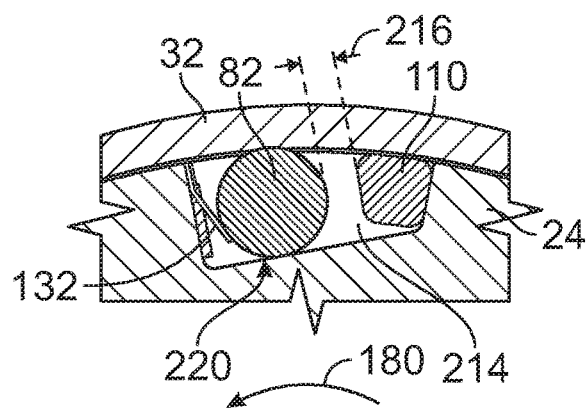
FIGS. 18 and 19 are views similar to FIG. 15 showing the nut head actuating tab turning in the counterclockwise loosening direction relative to the threaded body and shifting the roller to an unlocked position wherein the roller permits the threaded body to turn in the counterclockwise loosening direction with turning of the nut head in the counterclockwise loosening direction.
Figure 19:
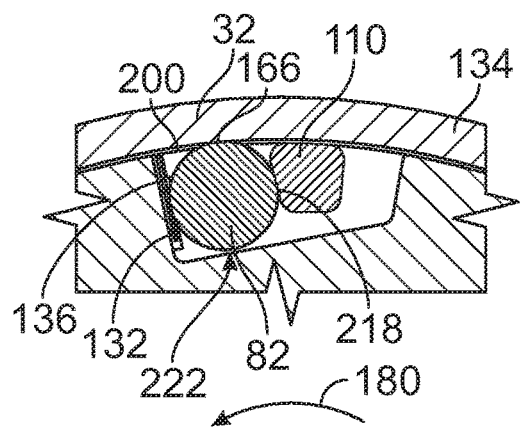

Regarding FIGS. 18 and 19, when the nut head 30 is turned in the loosening direction 180, each actuating tab 110 of the nut head 30 shifts in direction 180 and closes a gap 214 having a distance 216 between the actuating tab 110 and the roller 82. The continued turning of the nut head 30 in loosening direction 180 brings a surface 218 of the actuating tab 110 into contact with the surface 166 of the roller 82. The actuating tab 110 urges the roller 82 in direction 180 and deflects the arm portion 156 of the spring tab 132 which permits the roller 82 to shift from an radially narrower, intermediate portion 220 of the ramp opening 112 (see FIG. 18) to a radially wider, end portion 222 (see FIG. 19) of the ramp opening 112. The end portion 222 has a larger radial width so that the roller 82 is no longer wedged between the ramp surface 130 and the annular wall 134 of the washer 32. The roller 82 in the end portion 222 of the ramp opening 112 may roll or slide along the surface 200 of the annular wall 134 of the washer 32. The surface 218 of the actuating tab 110 may have a curved, flat, or other wised surface that contacts the roller surface 166 and permits the roller 82 to rotate. With the actuating tabs 110 overcoming the bias of the spring tabs 132 and keeping the rollers 82 in the unlocked positions thereof, the driving tabs 100 may turn the threaded body 24 in the loosening direction 180 while the rollers 82 roll or slide along the washer annular wall 134.

In one embodiment, one or more of the threaded body 24, washer 32, nut head 30, spring ring 84, and rollers 82 are made of metallic, plastic, and/or elastomers such as rubber. As an example, the threaded body 24, washer 32, nut head 30, spring ring 84, and rollers 82 are all made of steel.

Figure 20:
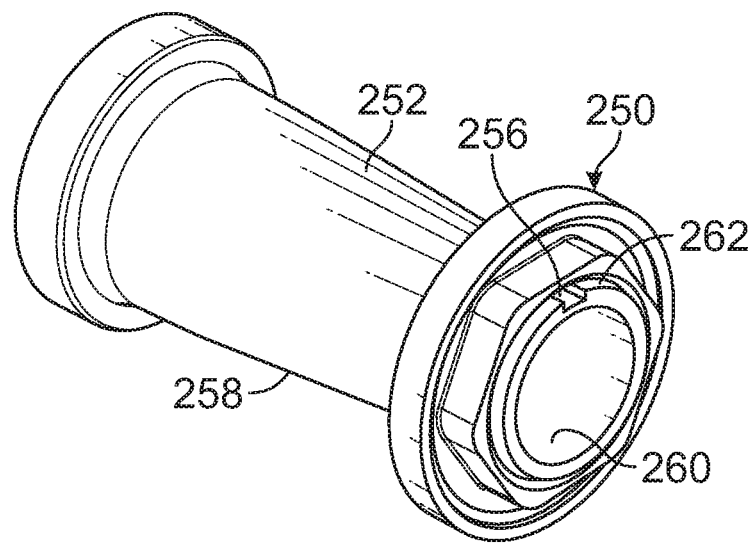
FIG. 20 is a perspective view of another lock nut engaged with threads of a spindle.
Figure 21:
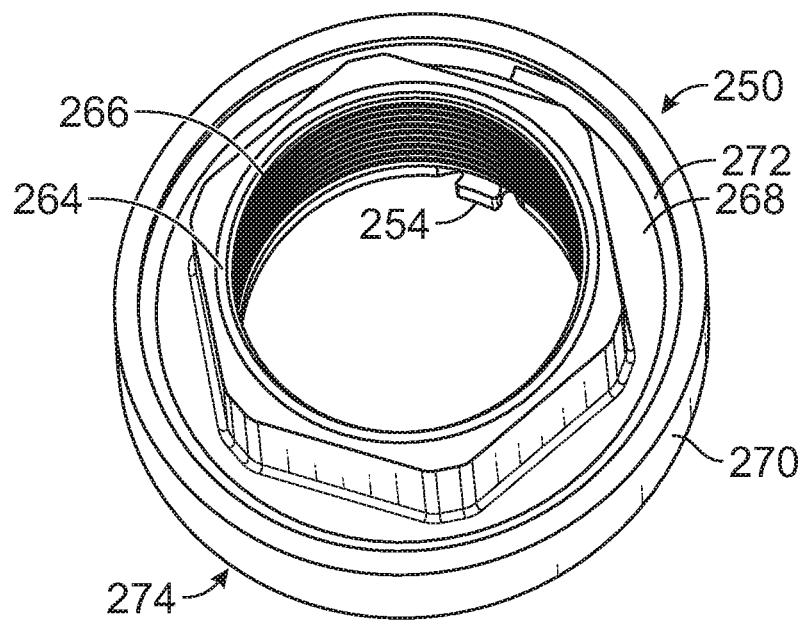
FIG. 21 is a perspective view of the lock nut of FIG. 20 showing a central opening of a threaded body of the lock nut.

Regarding FIGS. 20 and 21, a lock nut 250 is provided that is similar in many respects to the lock nut 22 discussed above such that differences will be highlighted. The lock nut 250 is shown mounted to a spindle 252 with a tang 254 received in a keyway 256 of the spindle 252. Like the lock nut 22, the lock nut 250 may be used in a variety of applications such as nuts for aerospace applications and the components of the lock nuts 22, 250 may be implemented in a variety of environments such as in a vehicle transmission. Other applications may include heavy industries such as earthmoving and power generation equipment. In the embodiment of FIG. 20, the spindle 252 has a tubular side wall 258, a through opening 260, and a threaded portion 262. Regarding FIG. 21, the lock nut 250 includes a threaded body 264 having threads 266 configured to engage the threaded portion 262 of the spindle 252. The lock nut 250 includes a nut head 268, a washer 270, and a retaining ring 272.

Figure 22:
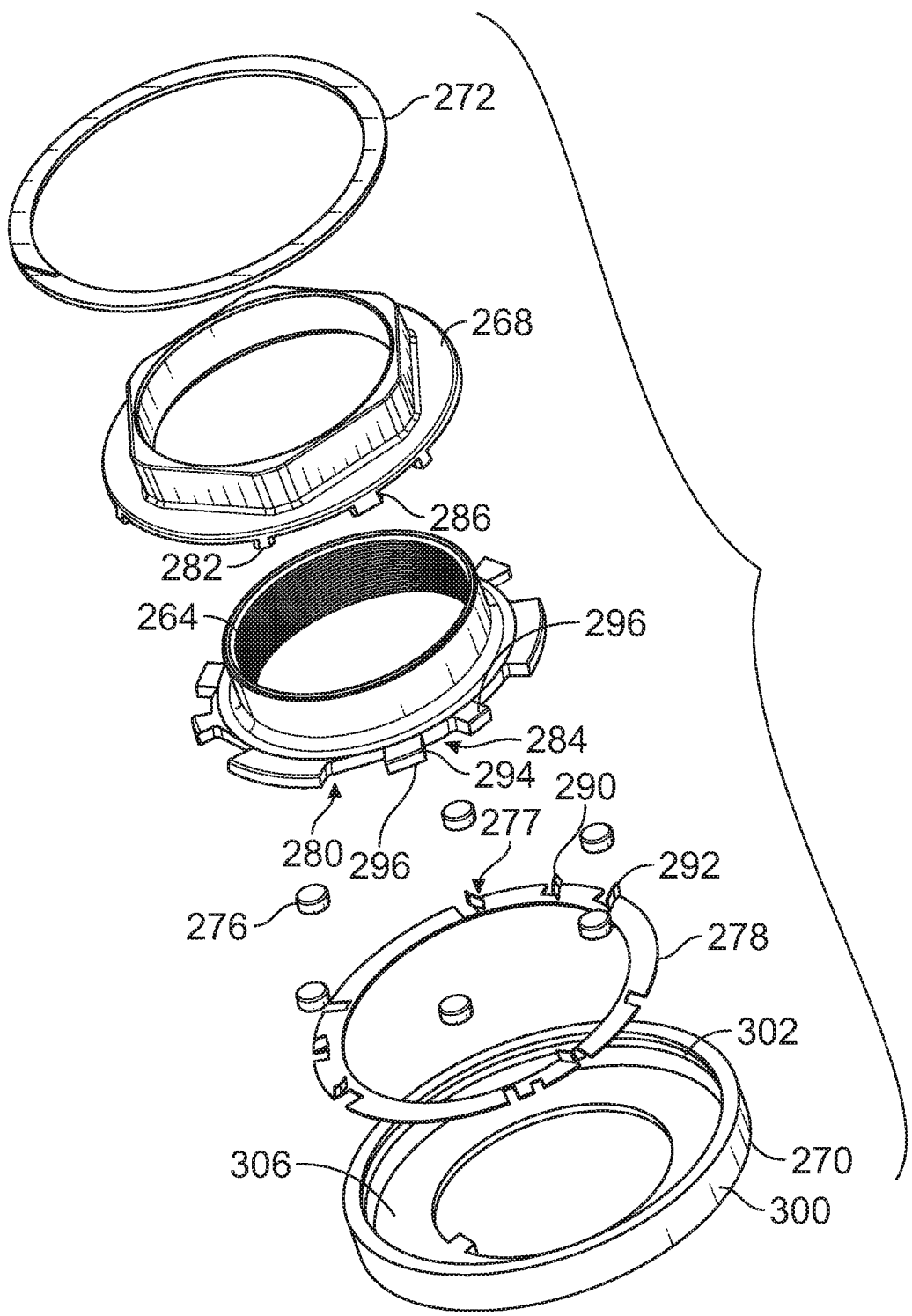
FIG. 22 is an exploded view of the lock nut of FIG. 21 showing a retaining ring, a nut head, the threaded body, rollers, a spring ring, and a washer of the lock nut.

Regarding FIGS. 21 and 22, the lock nut 250 has one or more roller locks 274 that include rollers 276 and spring tabs 277 of a spring ring 278. The threaded body 264 includes ramp openings 280 that receive the rollers 276 and the spring tabs 277 as well as actuating tabs 282 of the nut head 268. The threaded body 264 further includes drive openings 284 that receive driving tabs 286 of the nut head 268. Each drive opening 284 also receives a pair of stop tabs 290, 292 of the spring ring 278 that abut surfaces 294 of flange portions 296 of the threaded body 264. The contact between the driving tabs 286, stop tabs 290, 292, and the surfaces 294 of the flange portions 296 permits turning of the threaded body 264 to be transferred to turning of the spring ring 278.

Figure 23:
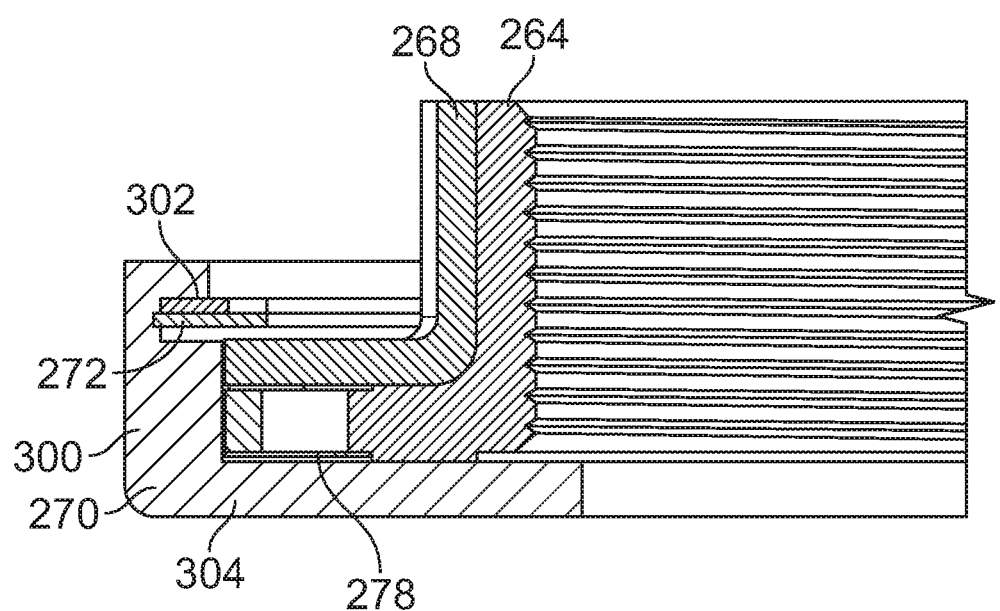
FIG. 23 is a cross-sectional view of a portion of the lock nut of FIG. 21 showing the retaining ring capturing a nut head flange, a threaded body flange, and the spring ring in a compartment of the washer.

Regarding FIGS. 22 and 23, the washer 270 has an annular wall 300 having a retaining groove 302 that receives the retaining ring 272. The annular wall 300 and the collar portion 304 define a compartment 306 of the washer 270 that receives at least a portion of the spring ring 278, threaded body 264, and nut head 268. The retaining ring 272 may be resiliently compressed to be inserted into the groove 302 and then released to capture the nut head 268, threaded body 264, and spring ring 270 in the washer compartment 306.

Figure 24:
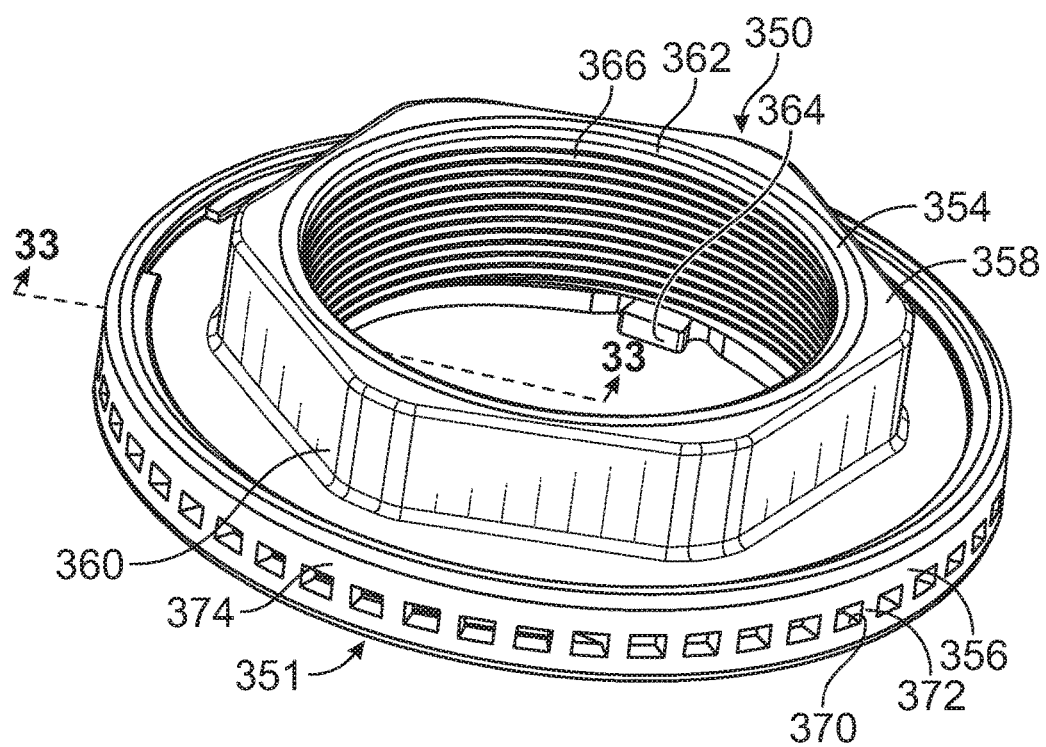
FIG. 24 is a perspective view of a lock nut having spring locks that inhibit unintentional loosening of a threaded body of the lock nut.
Figure 25:
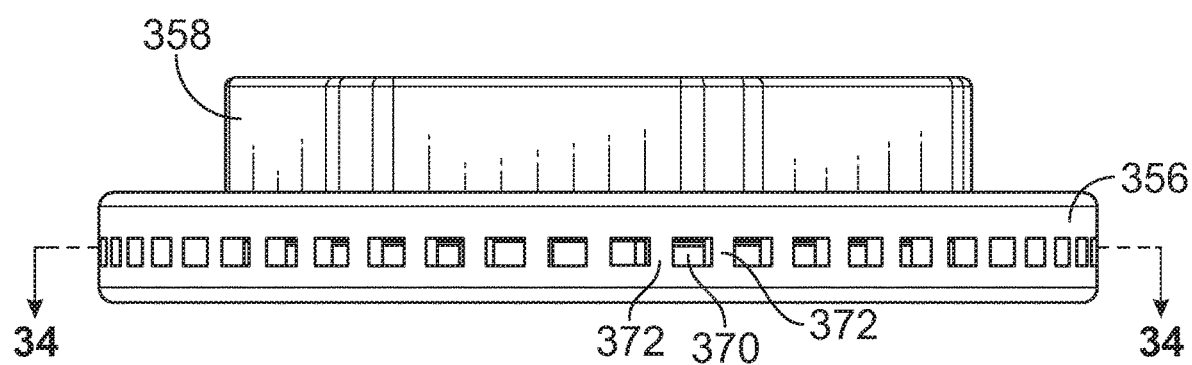
FIG. 25 is a side elevational view of the lock nut of FIG. 24 showing an upper nut head and a lower washer of the lock nut.

Regarding FIG. 24, a lock nut 350 is provided that is similar in many respects to the lock nut 22 discussed above such that differences will be highlighted. One such difference is that the lock nut 350 includes a lock including a ratchet freewheel clutch 351 having one or more spring locks 352 (see FIG. 34) that selectively limit turning of a threaded body 354 of the lock nut 350 relative to a washer 356 of the lock nut 350. The lock nut 350 also includes a nut head 358 having a rotary drive structure 360 such as a hex nut configuration. The threaded body 354 includes a through opening 362 for receiving a spindle, a tang 364 for engaging a keyway of the spindle, and threads 366 for engaging threads of the spindle. The washer 356 includes one or more openings 370 and teeth 372 therebetween formed in an annular wall 374 of the washer 356.

Figure 26:
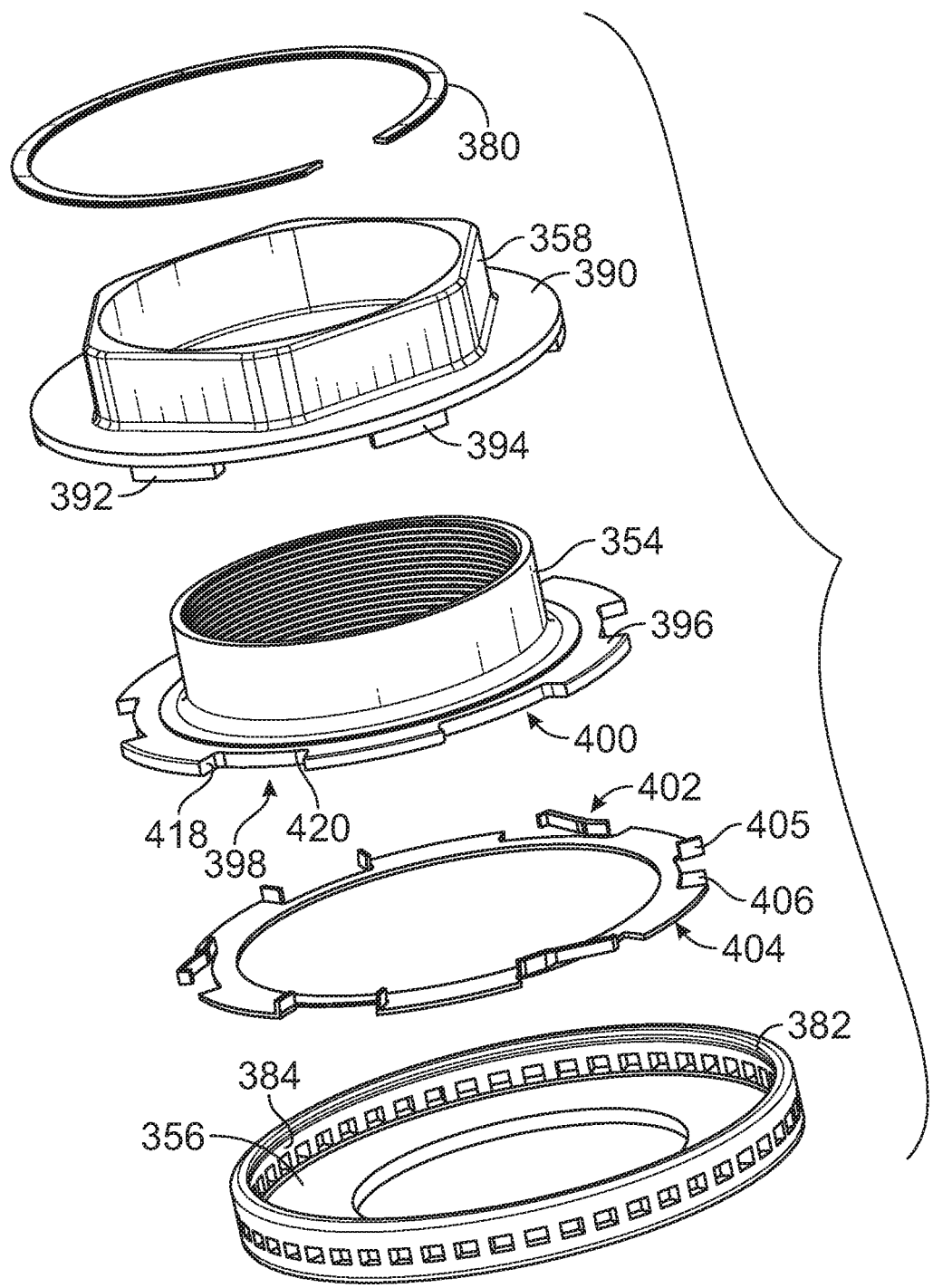
FIG. 26 is an exploded view of the lock nut of FIG. 24 showing a retaining ring, the nut head, the threaded body, a spring ring, and the washer.

Regarding FIG. 26, the lock nut 350 includes a resilient retaining ring 380 that snaps into a groove 382 of the washer 356 and retains the various components of the lock nut 350 in a compartment 384 of the washer 356. The nut head 358 includes a flange 390 having one or more driving tabs 392 and one or more actuating tabs 394 depending therefrom. The threaded body 354 includes flange portions 396, one or more drive openings 398 that receive the driving tabs 392, and one or more spring openings 400 that receive the actuating tabs 394 and spring pawls 402 of a spring ring 404. The drive openings 398 also receive stop tabs 405, 406 of the spring ring 404. The contact between the stop tabs 405, 406 and surfaces 418, 420 of the flange portions 396 of the threaded body 354 transfer turning of the threaded body 354 into turning of the spring ring 404 within the washer 356.

Figure 27:
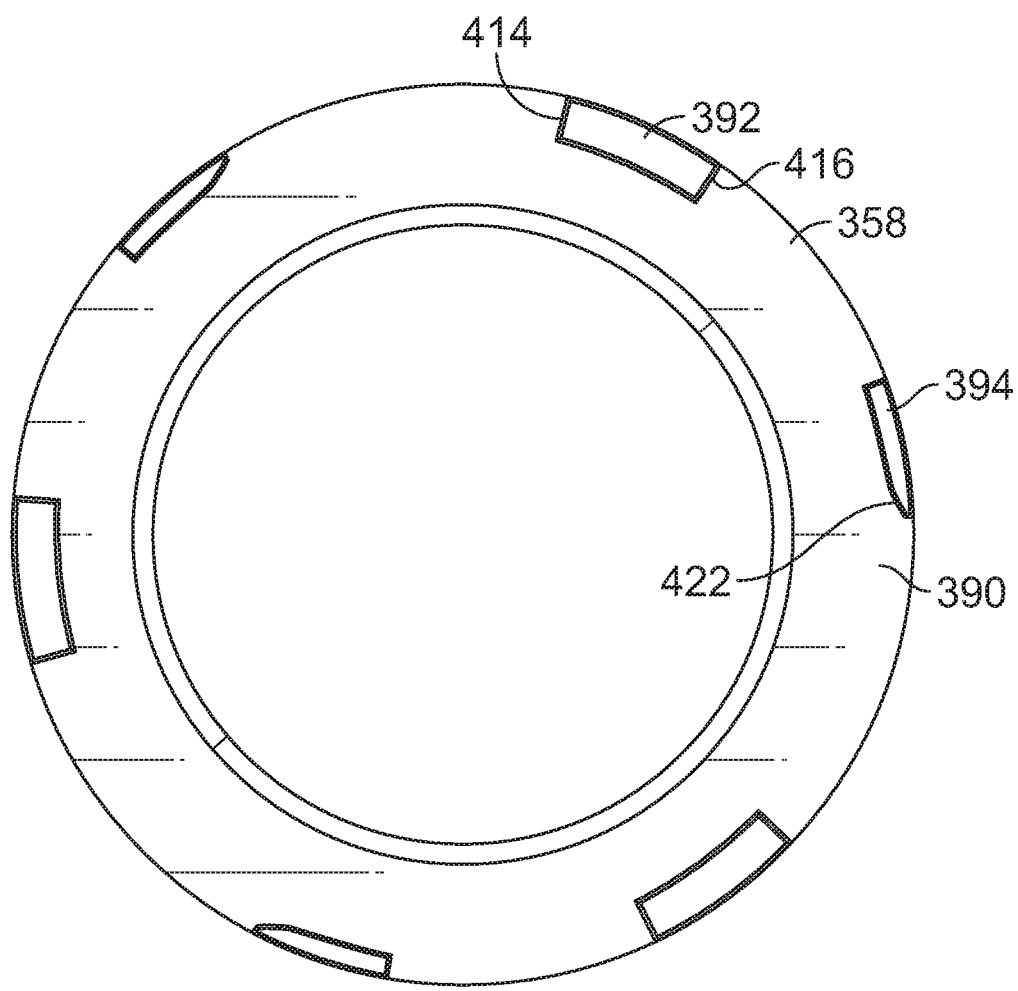
FIG. 27 is a bottom plan view of the nut head of FIG. 26 showing driving tabs and actuating tabs spaced circumferentially around the nut head.
Figure 28:
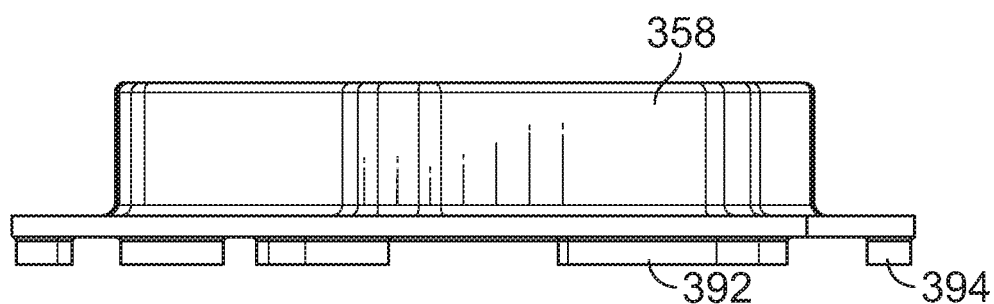
FIG. 28 is a side elevational view of the nut head of FIG. 27 showing the driving and actuating tabs depending from a flange of the nut head.

Regarding FIGS. 27 and 28, the driving tabs 392 of the nut head 358 may have different shapes than the actuating tabs 394. Each driving tab 392 includes surfaces 414, 416 for contacting surfaces 418, 420 (see FIG. 29) of the threaded body 354 and causing turning of the threaded body 354 with turning of the nut head 358. Regarding FIG. 27, the actuating tabs 394 of the nut head 358 each include a cam portion, such as a ramp surface 422, that is configured to shift the associated spring pawl 402 from a locked configuration to an unlocked configuration with turning of the nut head 358 in a loosening direction relative to the threaded body 354 as discussed in greater detail below.

Figure 29:
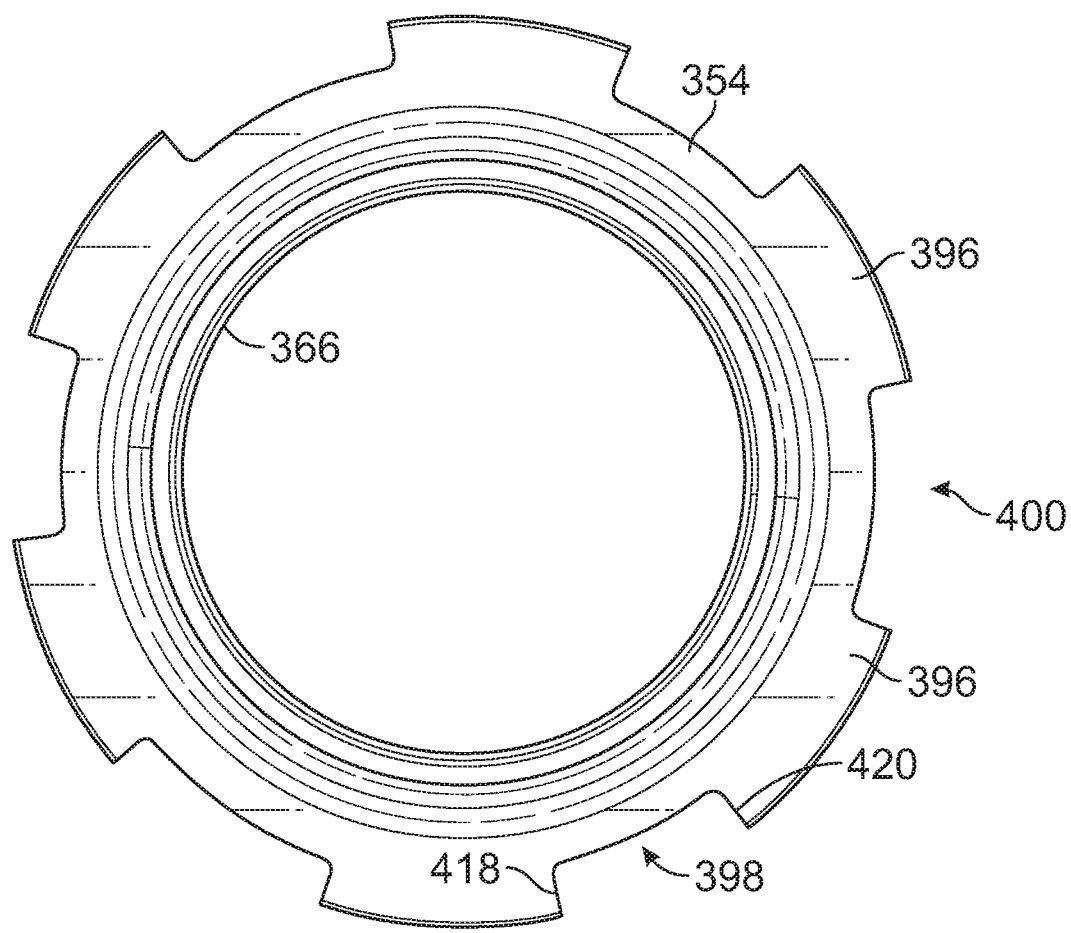
FIG. 29 is a top plan view of the threaded body of FIG. 26 showing circumferentially spaced openings of a flange of the threaded body that receive the driving and actuating tabs of the nut head.
Figure 30:
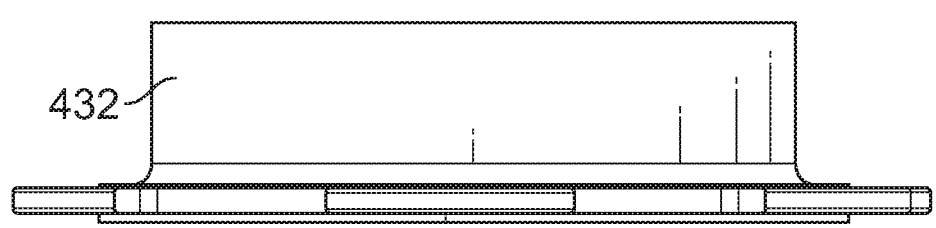
FIG. 30 is a side elevational view of the threaded body of FIG. 29 showing a riser upstanding from the flange of the threaded body.

Regarding FIGS. 29 and 30, the threaded body 354 includes flange portions 396 separating the drive openings 398 and the spring openings 400. The threaded body 358 further includes a riser 432 upstanding from the flange portions 396 and including the threads 366 for engaging threads on the associated spindle.

Figure 31:
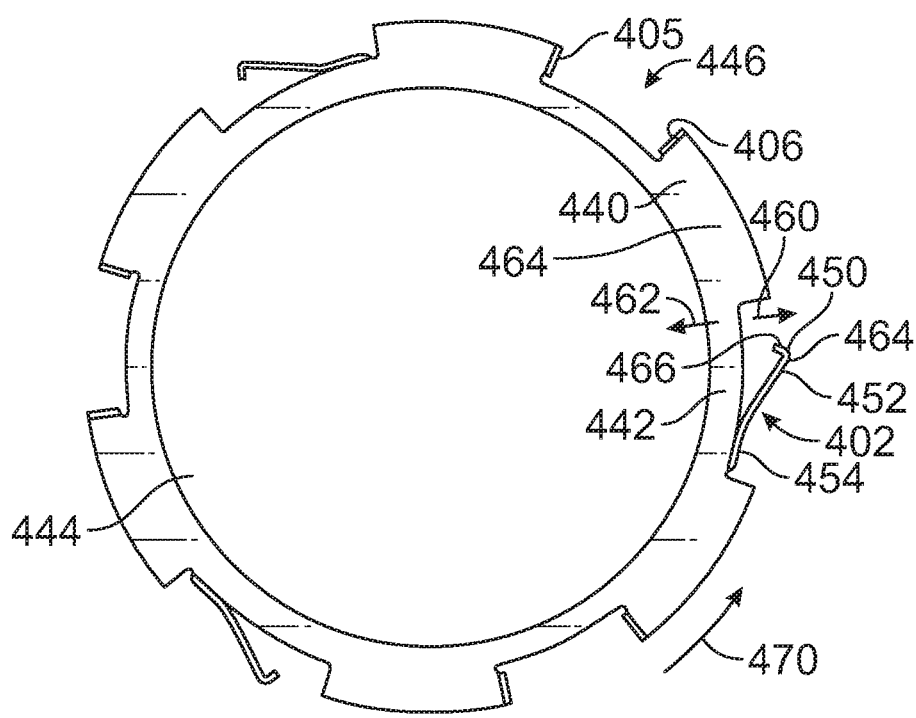
FIG. 31 is a top plan view of the spring ring of FIG. 26 showing spring pawls spaced circumferentially around the spring ring, the springs pawls having pawl portions that fit into openings of the washer to inhibit turning of the spring ring and threaded body connected thereto.

Regarding FIG. 31, the spring ring 404 has a central opening 444 and includes flange portions 440 connected by connecting portions 442. The stop tabs 405, 406 are separated by a recess 446 and may each be formed by being bent out of plane from one of the associated flange portions 440. The spring pawls 402 may each include a pawl portion 450 and a spring such as an arm portion 452 and a base portion 454 that bias the pawl portion 450 into engagement with the teeth 372.

In one embodiment, the spring ring 404 including the stop tabs 405, 406 and spring pawls 402 has a unitary, one-piece construction. To form the spring pawls 402, the base portion 454 may be bent out of plane from the associated connecting portion 442. The arm portion 452 and/or base portion 454 resiliently deform to permit the pawl portion 450 to ratchet back and forth in a radially outward direction 460 and a radially inward direction 462. The pawl portion 450 may have a generally L-shape including a corner 464 for fitting into one of the openings 370 and a catch portion 466 for contacting a stop surface of one of the teeth 372 adjacent the one opening 370. The contact between the catch portion 466 and the tooth 372 inhibits turning of the spring ring 404, and the threaded body 354 connected thereto, in a counterclockwise, loosening direction 470 until the nut head 358 is turned in the loosening direction to cause the associated actuating tab 394 to shift the pawl portion 450 radially inward to an unlocked position as discussed in greater detail below. In some embodiments, the spring ring 404 may be an assembly of components.

Figure 32:
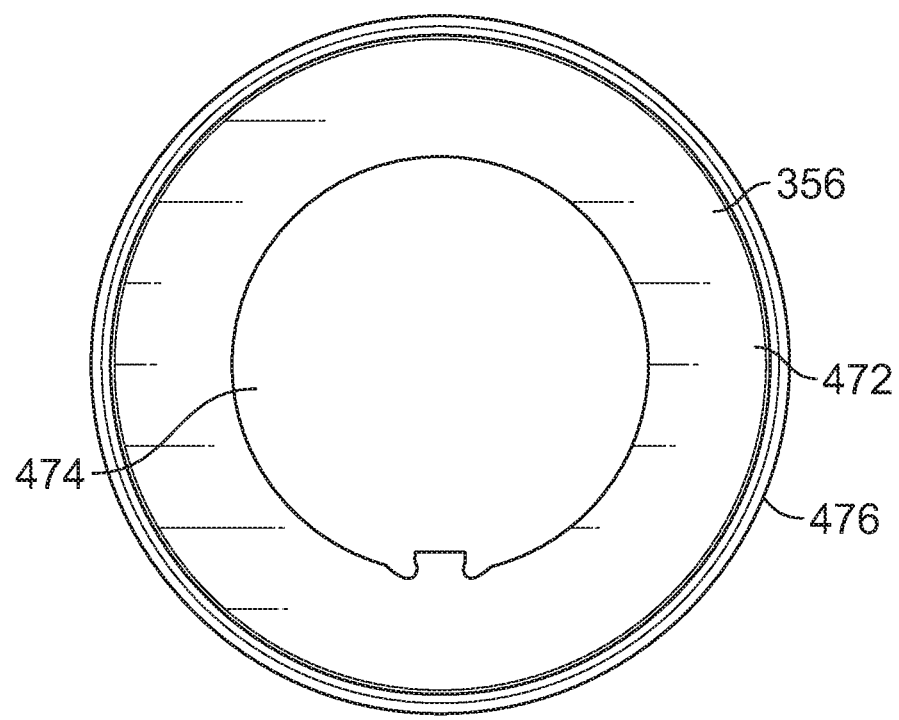
FIG. 32 is a top plan view of the washer of FIG. 26 showing a collar, a tang extending radially inward from the collar, and an annular wall of the washer.

Regarding FIG. 32, the washer 356 includes a collar 472 extending around a central opening 474 and an annular wall 476. The spring ring 404 rotationally slides along the collar 472 as the spring ring 404 turns in the compartment 384 with turning of the threaded body 354.

Figure 33:
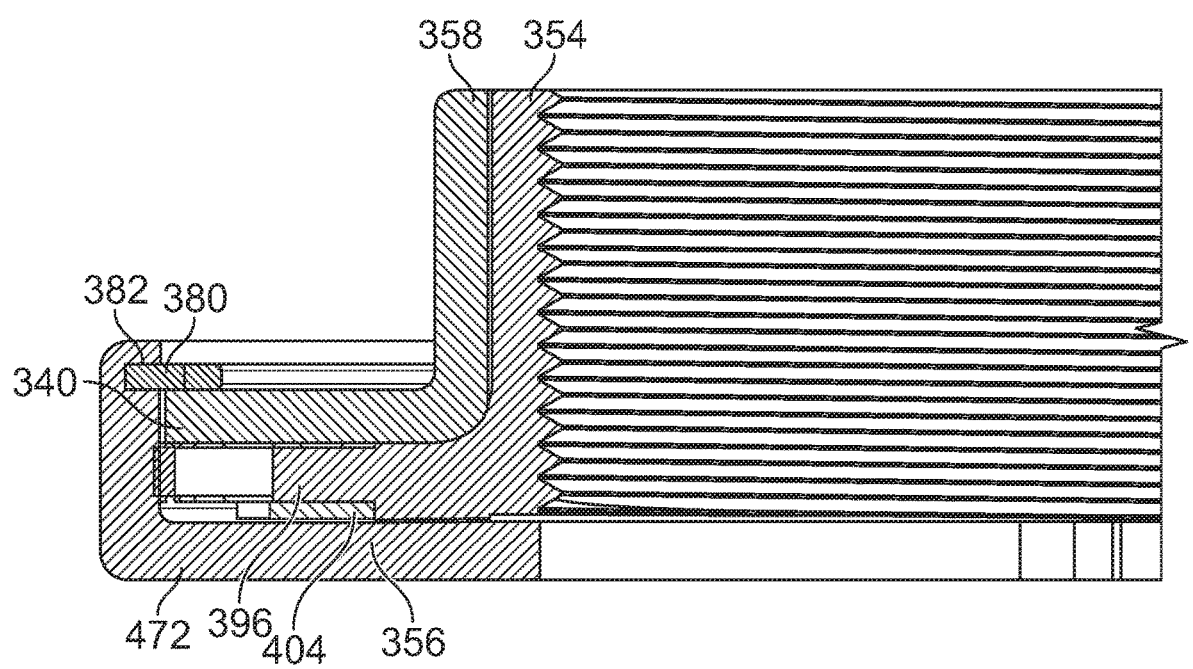
FIG. 33 is a cross-sectional view taken across line 33-33 in FIG. 24 showing the retaining ring capturing a nut head flange, a threaded body flange, and a spring ring in a compartment of the washer.

Regarding FIG. 33, the retaining ring 380 is shown received in channel 382 and capturing the flange portion 390 of the nut head 358, the flange portions 396 of the threaded body 354, and the spring ring 404 between the retaining ring 380 and the collar 472 of the washer 356. The retaining ring 380 limits the nut head 358, threaded body 354, and spring ring 404 to rotational movement relative to the washer 356.

Figure 34:
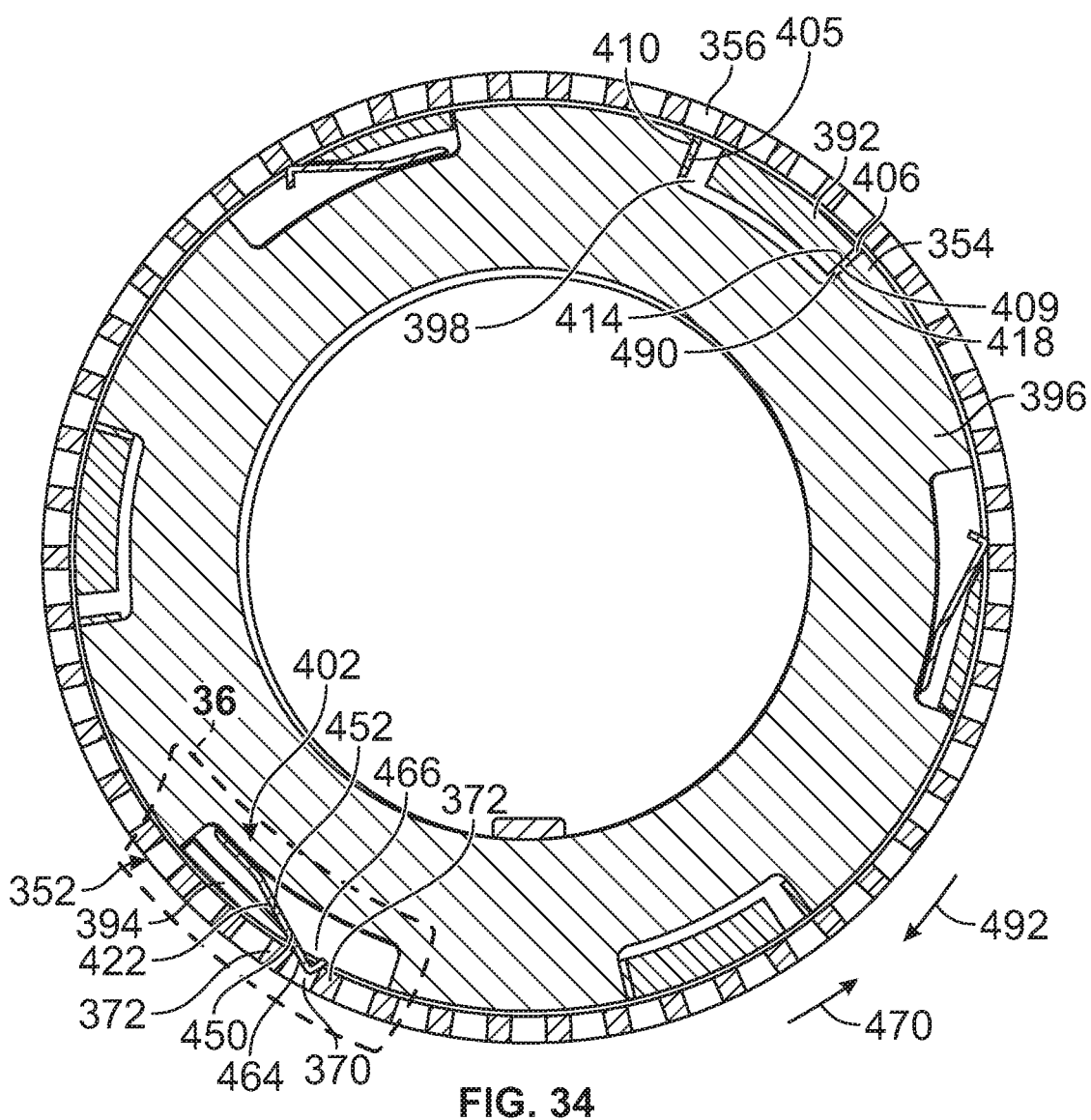
FIG. 34 is a cross-sectional view taken across line 34-34 in FIG. 25 showing the spring locks of the lock nut in a locked configuration that inhibits turning of the threaded body in a counterclockwise loosening direction.

Regarding FIG. 34, the spring locks 352 are configured so that one of the spring locks 352 is in a locked configuration and inhibits turning in the counterclockwise loosening direction 470 at any rotational position of the threaded body 354 relative to the washer 356. The openings 370, teeth 372, and spring pawls 402 are configured so that a first spring pawl 402 is locked with the teeth 372 to inhibit turning of the threaded body 354 in loosening direction 470 while the second and third spring pawls 402 are unlocked. When a user turns the nut head 358 in tightening direction 492 approximately 2.4 degrees, the first spring pawl 402 shown in the dashed box of FIG. 34 unlocks, the second spring pawl 402 locks, and the third spring pawl 402 remains unlocked. If the user continues to turn the nut head 358 in tightening direction 492 another approximately 2.4 degrees, the first spring pawl 402 remains unlocked, the second spring pawl 402 unlocks, and the third spring pawl 402 locks. The unlocked spring pawls 402 are pushed radially inward by the teeth 372 and are effectively waiting until the pawl portion 450 of the spring pawl 402 is radially aligned with one of the openings 370 and may snap radially outward fully into the opening 370. In this manner, there is one spring lock 352 in a locked configuration for every 2.4 degrees of rotational increment of the threaded body 354 relative to the washer 356.

Regarding FIG. 34, the lock nut 350 is shown with the spring lock 352 in the dashed box in a locked configuration while the other two spring locks 352 are unlocked. The driving tabs 392 of the nut head 358 and the stop tabs 405, 406 are received in the drive openings 398 of the threaded body 354. Each driving tab 392 has the surface 414 thereof contacting a surface 490 of the stop tab 406. The stop tab 406 is thereby sandwiched between the surface 414 of the driving tab 392 and the surface 418 of the flange portion 396 of the threaded body 354. In this configuration, the nut head 358 may be turned in a clockwise, locking direction 492 so that the driving tab 392 of the nut head 358 urges the stop tab 405 of the spring ring 404 and flange portion 396 of the threaded body 354 in the tightening direction 492. The spring pawls 402 may ratchet and permit the turning of the threaded body 354 in the tightening direction 492 as discussed in greater detail below. While the spring pawls 402 are ratcheting, there may always be one spring lock 352 in a locked configuration to inhibit turning of the threaded body 354 in the loosening direction 470. The ratcheting permits the pawl portions 450 of the spring pawls 402 to shift radially inward from one opening 370, over an adjacent tooth 372, and into the next opening 370 as the threaded body 354 turns in tightening direction 492. Conversely, the spring pawls 402 sequentially each inhibit turning of the threaded body 354 in the counterclockwise, loosening direction 470.

Figure 36:
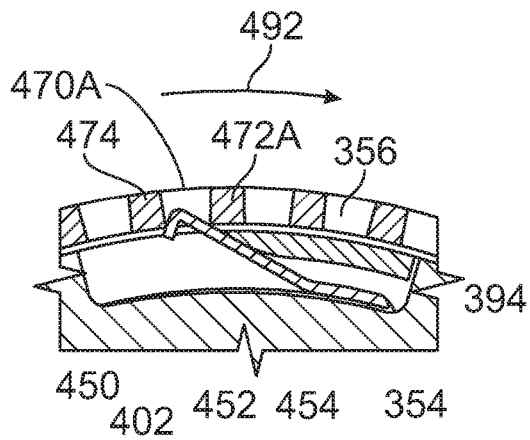
FIG. 36 is an enlarged view of the dashed area of FIG. 34.
Figure 37:
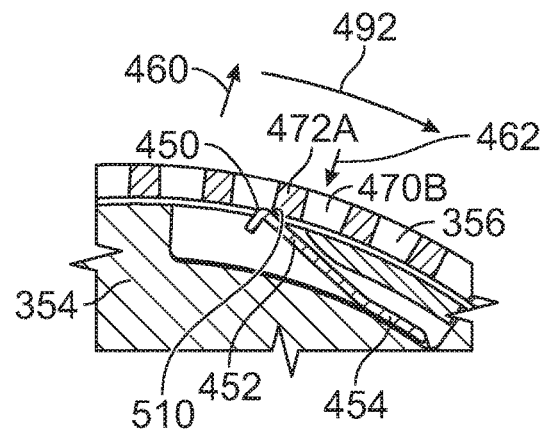
FIG. 37 is a view similar to FIG. 36 showing the nut head turning the threaded body and spring pawl in a clockwise tightening direction relative to the washer and causing a pawl portion of the spring pawl to ratchet over teeth of the washer.

Regarding FIGS. 36 and 37, one of the spring pawls 402 is shown ratcheting over tooth 472A as the threaded body 354 is turned in the tightening direction 492 by the driving tabs 392 of the nut head 358. More specifically, the turning of the driving tabs 392 in tightening direction 492 causes turning of both the threaded body 354 and the spring ring 404 in direction 492. As the base portion 454 of the spring ring 404 is turned in tightening direction 492, the pawl portion 450 contacts a corner 510 of the tooth 472A. The continued turning of the base portion 454 in tightening direction 492 causes the arm portion 452 and/or base portion 454 to deflect and permit the pawl portion 450 to shift radially inward in direction 462 to ratchet over the tooth 472A as shown in FIG. 37. Once the pawl portion 450 clears the tooth 472A, the resilient arm portion 452 and/or base portion 454 urges the pawl 450 back radially outward in direction 460 into the next opening 470B.

Figure 38:
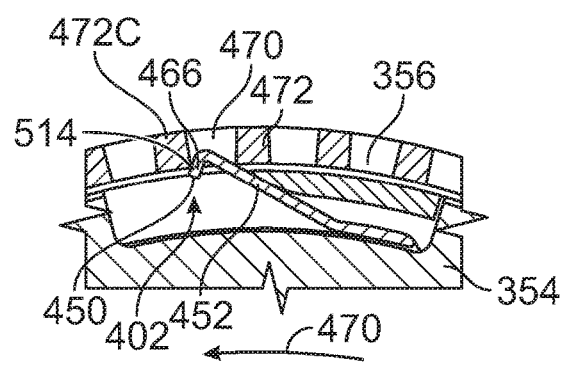
FIG. 38 is a view similar to FIG. 36 showing the pawl portion of the spring pawl engaged with one of the teeth of the washer and inhibiting turning of the spring ring and threaded body connected thereto in the counterclockwise loosening direction.

Regarding FIG. 38, the spring pawl 402 is shown in a locked position wherein the catch portion 466 of the pawl 450 is contacting a corner 514 of a tooth 472C, such as after a user has stopped applying torque to the nut head 358. Urging of the threaded body 354 in loosening direction 470 clamps the resilient arm portion 452 and base portion 454 between the threaded body 354 and the washer 356. The arm portion 452 and base portion 454 are configured to resist the turning in the loosening direction 470.

Figure 35:
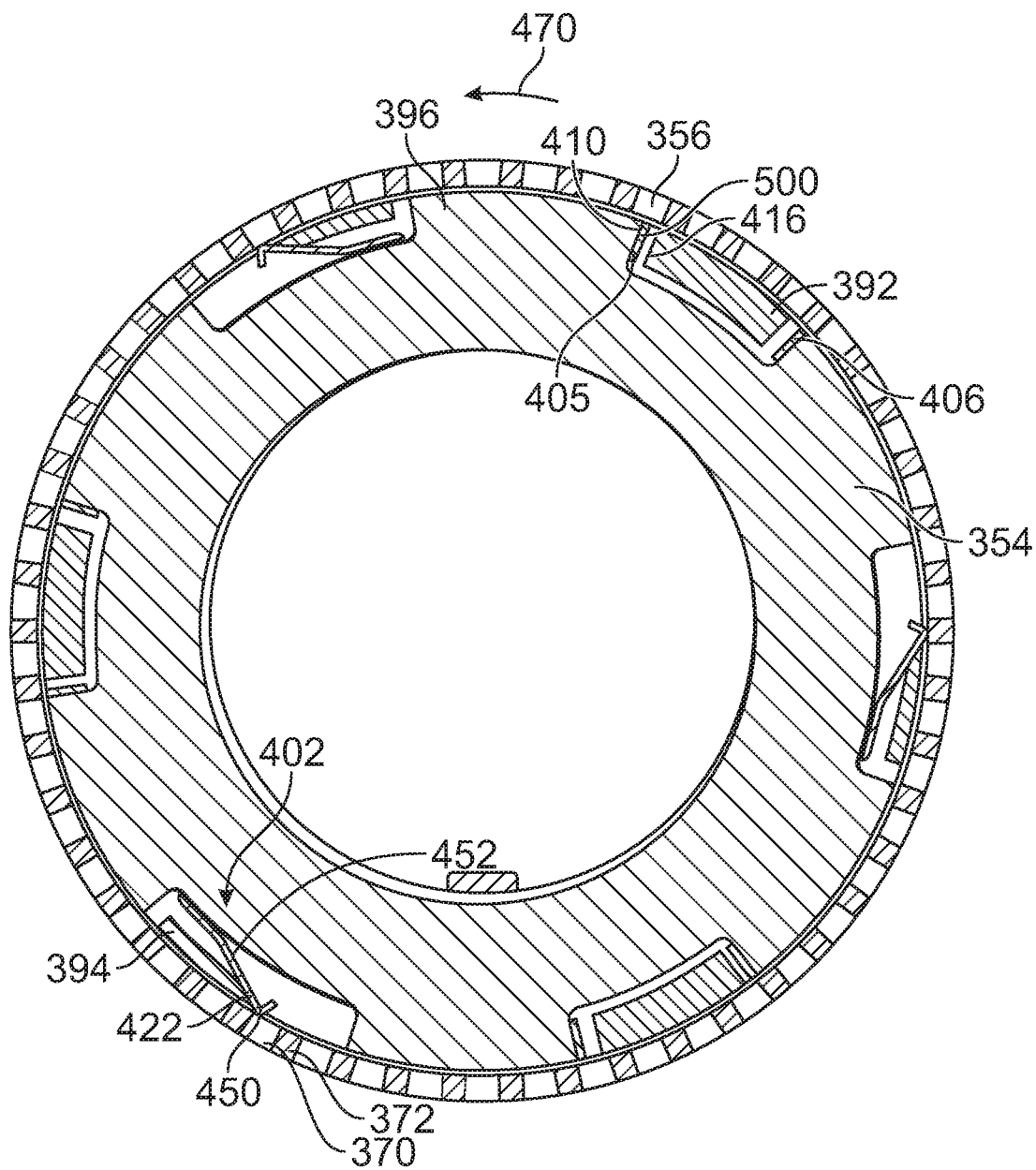
FIG. 35 is a view similar to FIG. 34 showing the nut head turned in the counterclockwise loosening direction and the nut head actuating tabs camming the spring pawls radially inward to unlocked positions that permits the nut head to turn the threaded body in the counterclockwise loosening direction.
Figure 39:
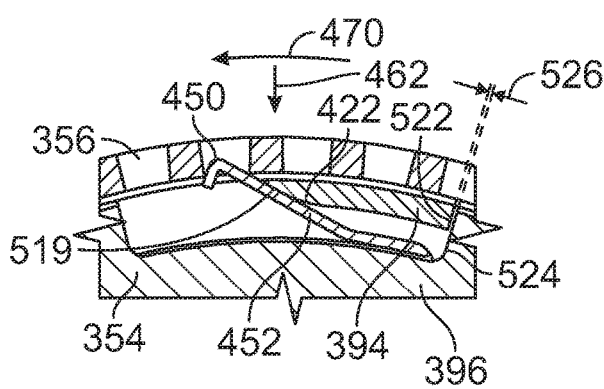
FIGS. 39 and 40 are views similar to FIG. 36 showing the nut head actuating tab turning in the counterclockwise loosening direction and camming the spring pawl radially inward to an unlocked position that permits the nut head, spring ring, and threaded body to turn together in the counterclockwise loosening direction relative to the washer.
Figure 40:
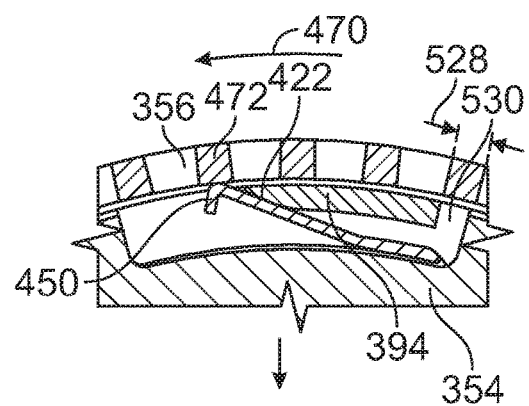

Regarding FIGS. 35, 39, and 40, when a user desires to loosen the lock nut 350 once the lock nut 350 has been secured to a spindle, the user turns the nut head 358 in loosening direction 470 which circumferentially shifts the actuating tabs 394 relative to the spring pawls 402. The ramp surface 422 of each actuating tab 394 urges the resilient arm portion 452 of the associated spring pawl 402 radially inward to disengage the pawl portion 450 from the teeth 372. This positions the pawl 450 in clearance with the teeth 372 such that the spring pawls 402 permit the drive tabs 392 of the nut head 358 to turn the threaded body 354 in the loosening direction 470. More specifically, the turning of the nut head 358 in loosening direction 470 relative to the threaded body 354 brings surface 416 of each driving tab 392 into contact with surface 500 of the associated stop tab 405. Continued turning of the nut head 358 in loosening direction 470 causes the driving tabs 392 to urge the stop tabs 405 of the spring ring 404 and the flange portions 396 of the threaded body 354 in the loosening direction 470.

Regarding FIGS. 39 and 40, the nut head 358 has turned in the loosening direction 470 which causes the actuating tab 394 to shift in direction 470. The actuating tab 394 engages the cam surface 422 thereof with an outer surface 519 of the arm portion 452 and cams the arm portion 452 and pawl portion 450 connected thereto radially inward in direction 462. As shown in FIGS. 39 and 40, the user's turning of the nut head 358 in loosening direction 470 separates surfaces 522, 524 of the actuating tab 394 and the threaded body flange portion 396 from a distance 526 to a distance 528, thus enlarging a gap 530 therebetween. The user continues turns the nut head 358 in the loosening direction 470 to overcome the bias force of the spring pawl 402 and keep the pawl 450 in the radially inward clearance or unlocked position which permits the pawl 450 to turn in direction 470 without engaging the teeth 472. With the pawl 450 in clearance with the teeth 472, the nut head 358, threaded body 354, and spring ring 404 may all turn together in direction 470 relative to the washer 356 in response to the user's turning of the nut head 358 in direction 470. The turning of the threaded body 354 in the loosening direction 470 advances the threaded body 354 in an outboard direction along the spindle to remove the lock nut 350 from the spindle.

Figure 41:
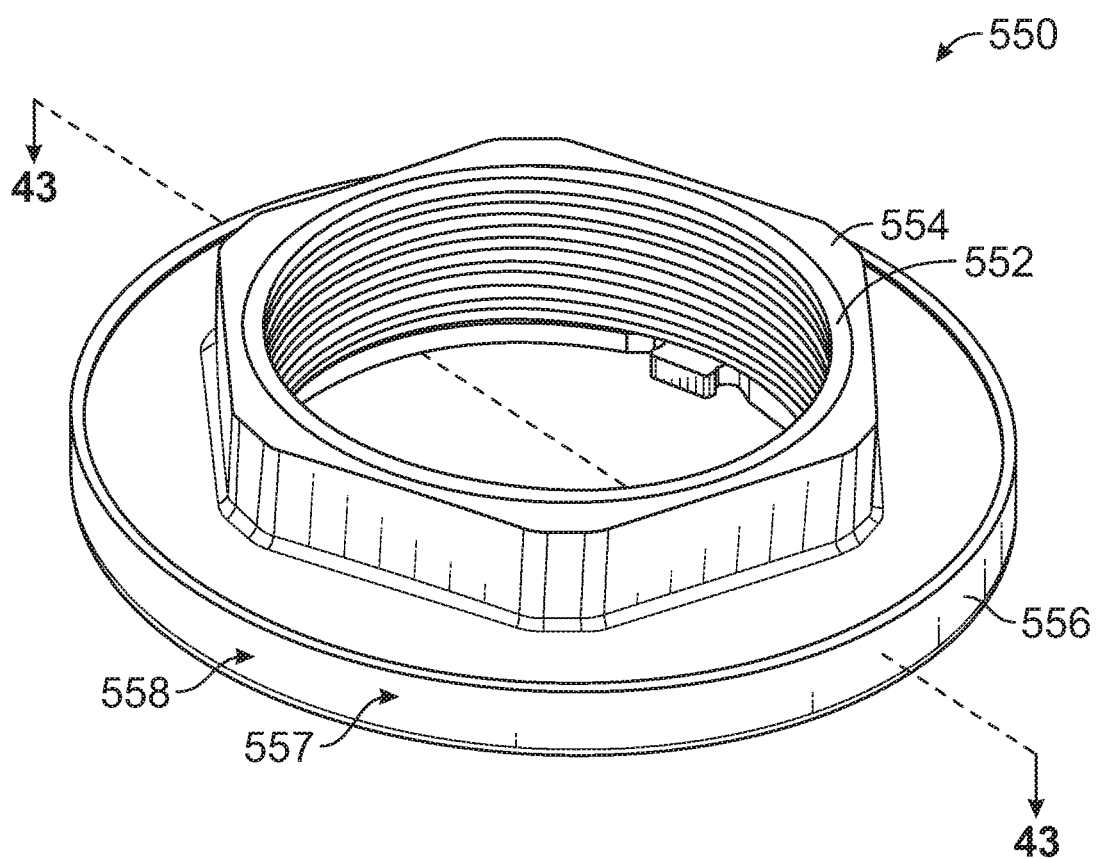
FIG. 41 is a perspective view of a lock nut having spring locks that inhibit unintentional turning of a threaded body of the lock nut in a counterclockwise loosening direction relative to a washer of the lock nut.
Figure 42:
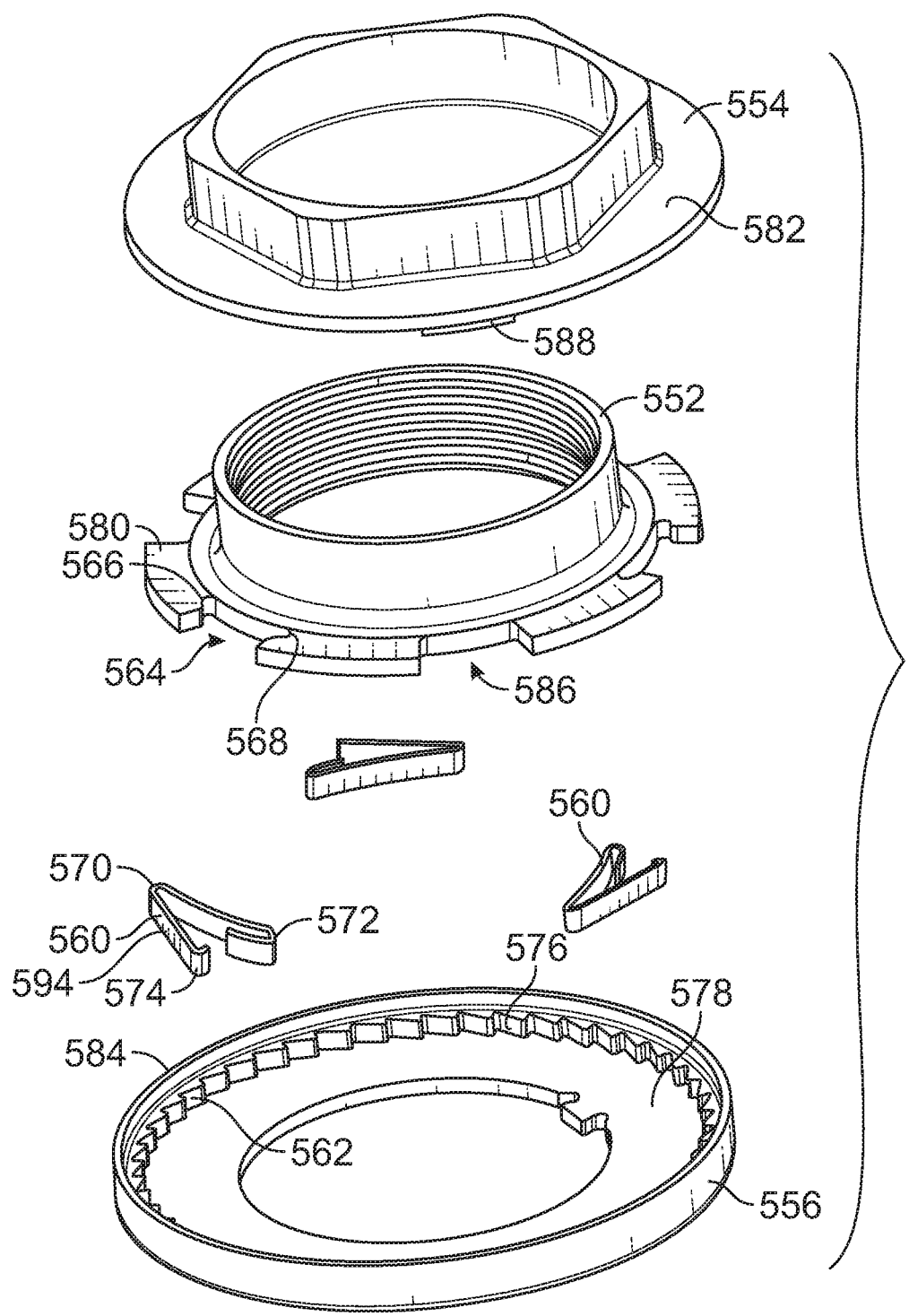
FIG. 42 is an exploded view of the lock nut of FIG. 41 showing a nut head, the threaded body, spring pawls, and the washer of the lock nut.

Regarding FIGS. 41 and 42, a lock nut 550 is provided that is similar in many respects to the lock nut 350 discussed above such that differences will be highlighted. The lock nut 550 includes a threaded body 552, a nut head 554, and a washer 556. The lock nut 550 includes a ratchet clutch 557 having one or more spring locks 558 that include one or more spring pawls 560 and a toothed gear 562 of the washer 556. The threaded body 552 includes spring openings 564 having pockets 566, 568 that each receive an end portion, such as an elbow 570, 572, of one of the spring pawls 560. The spring pawls 560 each include a pawl portion 574 that engage teeth 576 of the toothed gear 562 and a spring such as resilient arm portion 594A and/or elbow 570 that bias the pawl portion 574 into engagement with the teeth 576. The washer 556 includes a compartment 578 that receives flange portions 580 of the threaded body 552, the spring pawls 560 received in the spring openings 564, and a flange 582 of the nut head 554. The washer 556 includes a lip 584 that may be deformed, such as peened, over onto the flange 582 of the nut head 554 to rotatably connect the nut head 554 and threaded body 552 to the washer 556. The threaded body 552 also includes drive openings 586 that receive driving tabs 588 of the nut head 554.

Figure 43:
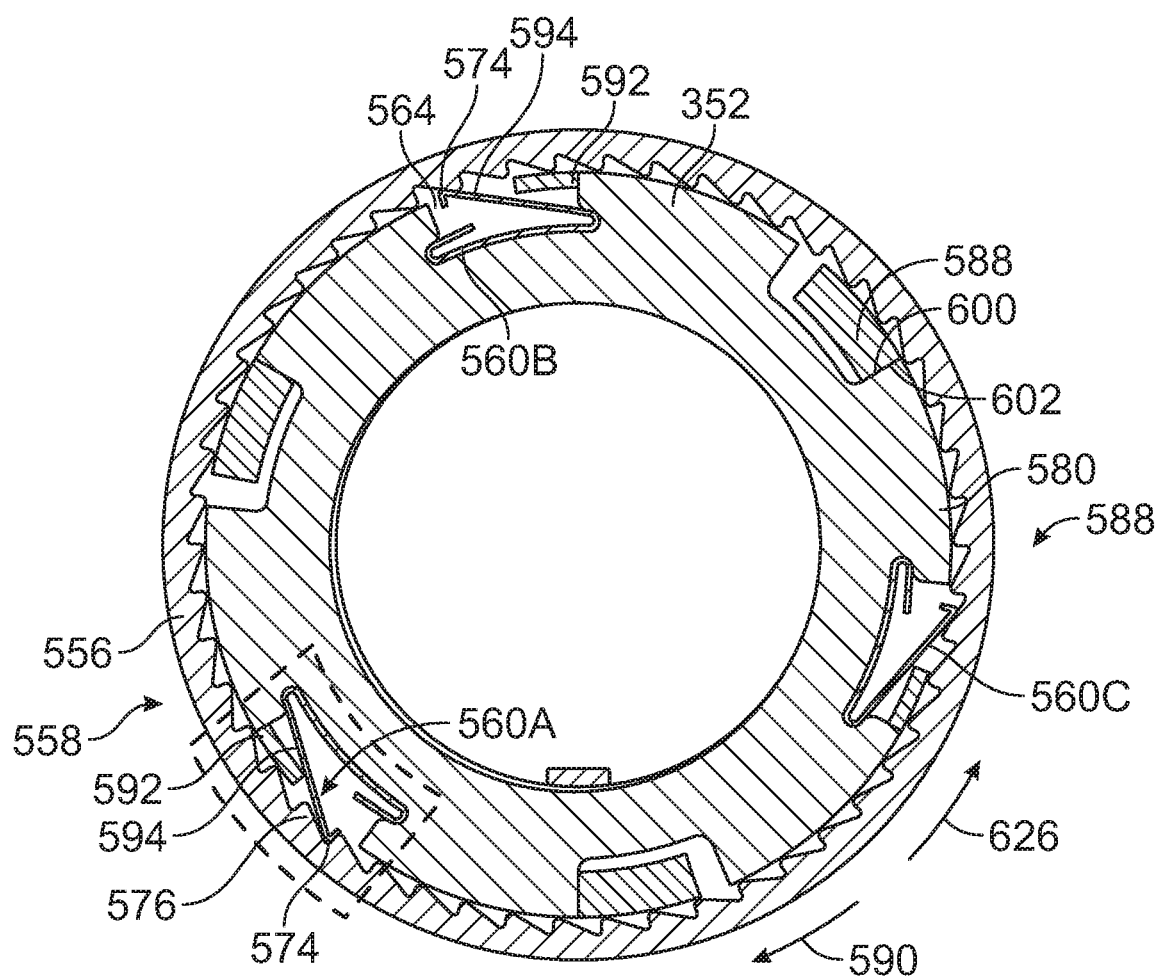
FIG. 43 is a cross-sectional taken across line 43-43 in FIG. 41 showing the spring locks in a locked configuration that inhibits turning of the threaded body in the counterclockwise loosening direction.

Regarding FIG. 43, the spring locks 558 are actuated in a sequential manner with turning of the threaded body 552 relative to the washer 556 in manner similar to the spring locks 352 discussed above with respect to FIG. 34. More specifically, a first spring pawl 560A in the dashed box of FIG. 43 is in a locked position while the second and third spring pawls 560B, 560C are unlocked. Turning of the threaded body 552 in tightening direction 590 from the position shown in FIG. 43 would shift the spring pawl 560A to an unlocked position, shift the spring pawl 560B to a locked position, and leave the spring pawl 560C in the unlocked position. Further turning of the threaded body 552 in direction 590 would leave the spring pawl 560A in unlocked position, shift the spring pawl 560B to an unlocked position, and shift spring pawl 560C to a locked position. In this manner, there is one spring pawl 560 in a locked position to inhibit turning of the threaded body 552 in loosening direction 626 at every rotary position of the threaded body 552 relative to the washer 556. In one embodiment, there may be a maximum of approximately 2.4 degrees that the threaded body 552 may turn in loosening direction 626 before one of the spring pawls 560 locks with the teeth 576 of the washer 556 and inhibits further turning of the threaded body 552.

Figure 45:
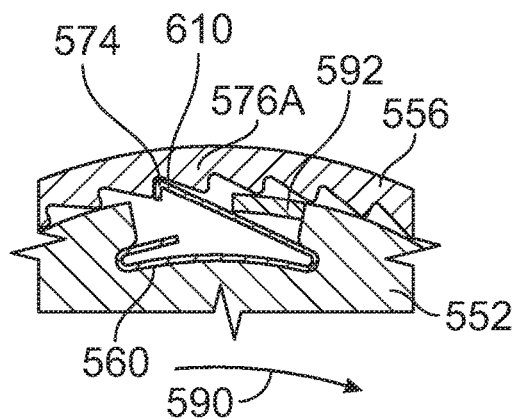
FIG. 45 is a view of the dashed area of FIG. 43 showing the spring pawl in a locked configuration.
Figure 46:
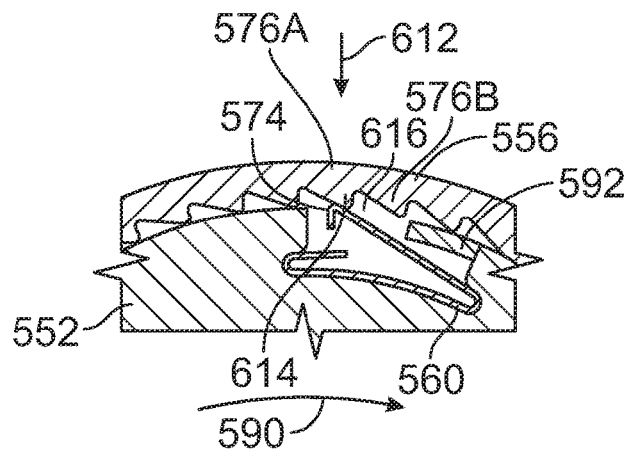
FIG. 46 is a view similar to FIG. 45 showing the threaded body turning in a clockwise tightening direction and the pawl portion of the spring pawl ratcheting over teeth of the washer.

Regarding FIG. 43, the spring openings 564 of the threaded body 352 receive actuating tabs 592 adjacent to resilient arm portions 594 of the spring pawls 560. Turning of the nut head 554 in tightening direction 590 urges the driving tabs 588 of the nut head 554 in direction 590 and abuts surfaces 600, 602 of the driving tab 588 and threaded body flange portion 580 to transfer turning of the nut head 554 into turning of the threaded body 552 relative to the washer 556. Regarding FIGS. 45 and 46, turning of the threaded body 552 and spring pawls 560 carried therein causes each pawl 574 to travel along the ramp surface 610 of tooth 576A and shift radially inward in direction 612. Continued turning of the threaded body 352 and spring pawl 560 in tightening direction 590 causes the pawl 574 to travel over a peak 614 of the tooth 576A, and into a recess 616 between the tooth 576A and an adjacent tooth 576B.

Figure 47:
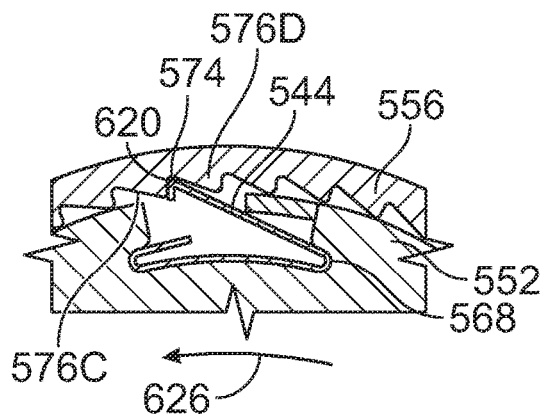
FIG. 47 is a view similar to FIG. 45 showing the pawl portion of the spring pawl engaging teeth of the washer to inhibit turning of the threaded body in the counterclockwise loosening direction relative to the washer.

Regarding FIGS. 43 and 47, the spring pawl 560 is locked and pawl 574 is abutting a stop surface 620 of the tooth 576C such that the resilient arm 594 of the spring pawl 560 is wedged between the stop surface 620 of the tooth 576C the ramp surface 610 of a nearby tooth 576D, and the pocket 568 of the threaded body 352. The resilient arm 594 thereby resists turning of the threaded body 352 relative to the washer 556 in the loosening direction 626.

Figure 44:
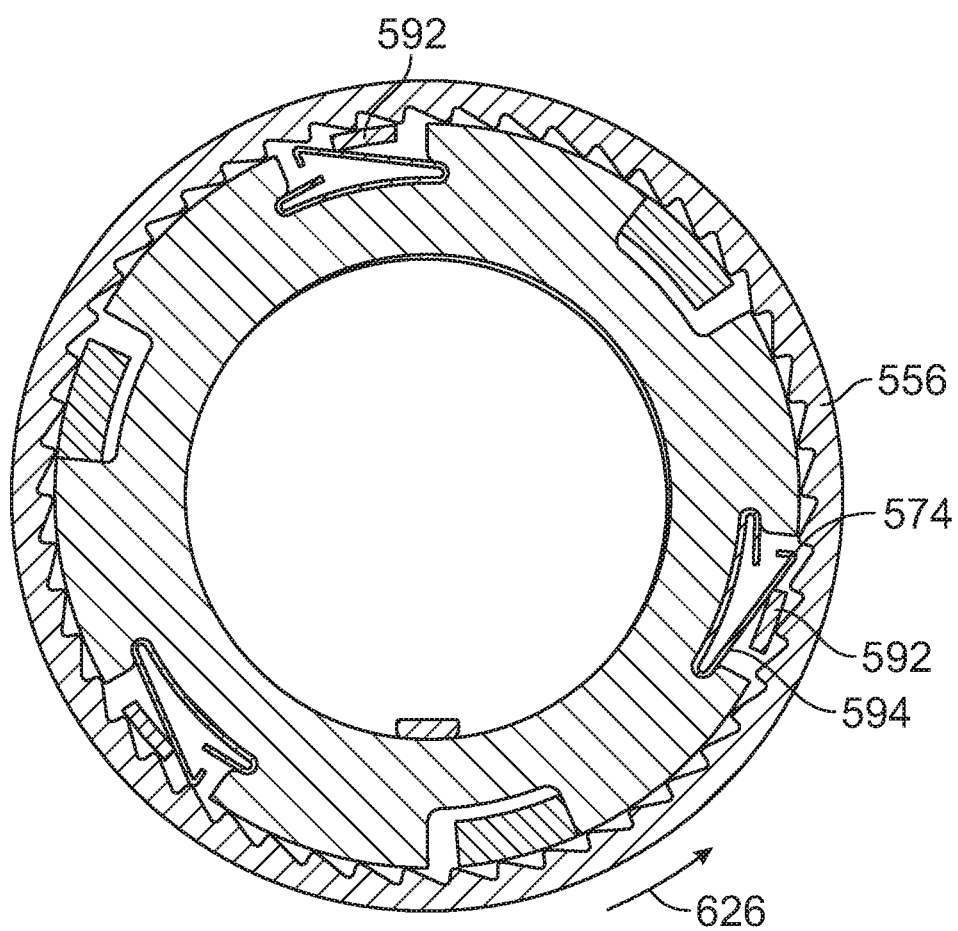
FIG. 44 is a view similar to FIG. 43 showing the nut head turned in the counterclockwise loosening direction relative to the threaded body so that the actuating tabs of the nut head cam the spring pawls radially inward to unlocked positions that permit the nut head, threaded body, and spring pawls to turn together in the counterclockwise loosening direction relative to the washer.
Figure 48:
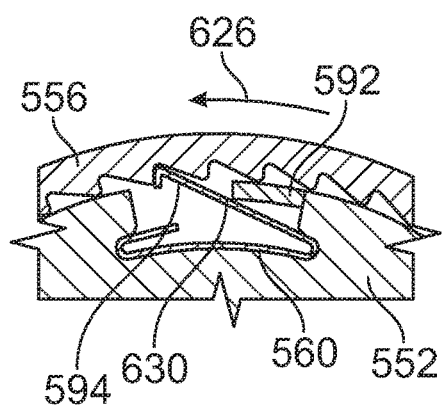
FIGS. 48 and 49 are views similar to FIG. 45 showing the nut head actuating tab turning in the counterclockwise loosening direction relative to the threaded body and camming the spring pawl radially inward into clearance with the teeth of the washer which permits the nut head, threaded body, and spring pawls to turn together in the counterclockwise loosening direction relative to the washer.
Figure 49:
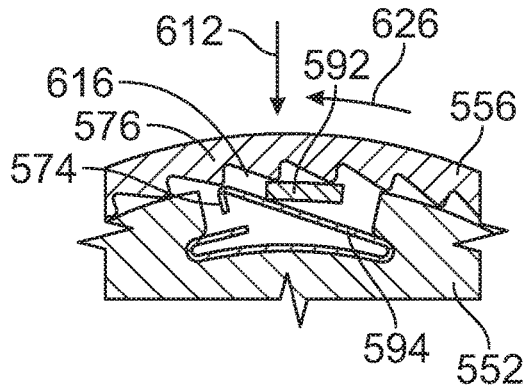

Regarding FIGS. 44, 48, 49, the user has turned the nut head 554 in loosening direction 626 to remove the lock nut 550 from a spindle. The turning of the nut head 554 in direction 626 causes the nut head actuating tab 592 to cammingly engage an outer surface 630 of the arm portion 594 of the spring pawl 560. The actuating tab 592 shifts the arm portion 594 and pawl 574 supported thereon radially inward in direction 612 so that the pawl 574 is radially inward and in clearance with the teeth 576 of the washer 556. By shifting the pawl 574 radially inward from the teeth 576, the spring pawl 560 no longer inhibits turning the threaded body 352 in direction 626 relative to the washer 556. The user may then continue to turn the nut head 554 in loosening direction 626 to cause the nut head 554 to turn the threaded body 552 and advance the lock nut 550 in an outboard direction off of the spindle.

Figure 50:
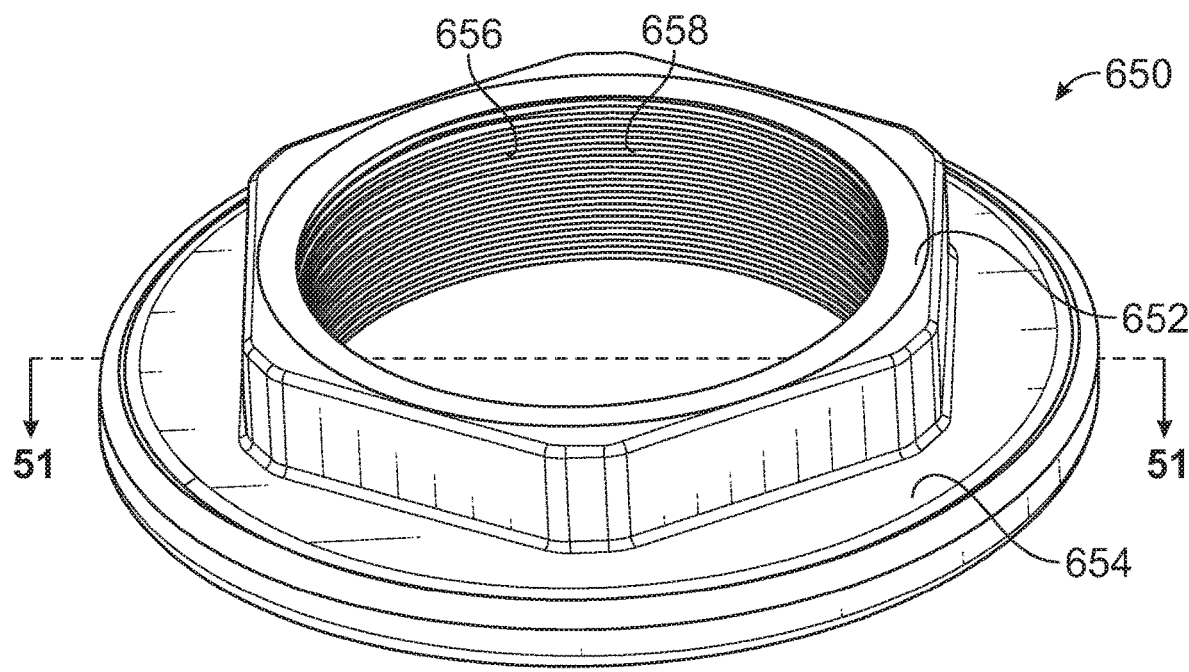
FIG. 50 is a perspective view of a nut having a threaded body and a nut head, the nut head having a rotary connection with the threaded body that permits the nut head to turn relative to the threaded body throughout a predetermined range of movement.
Figure 51:
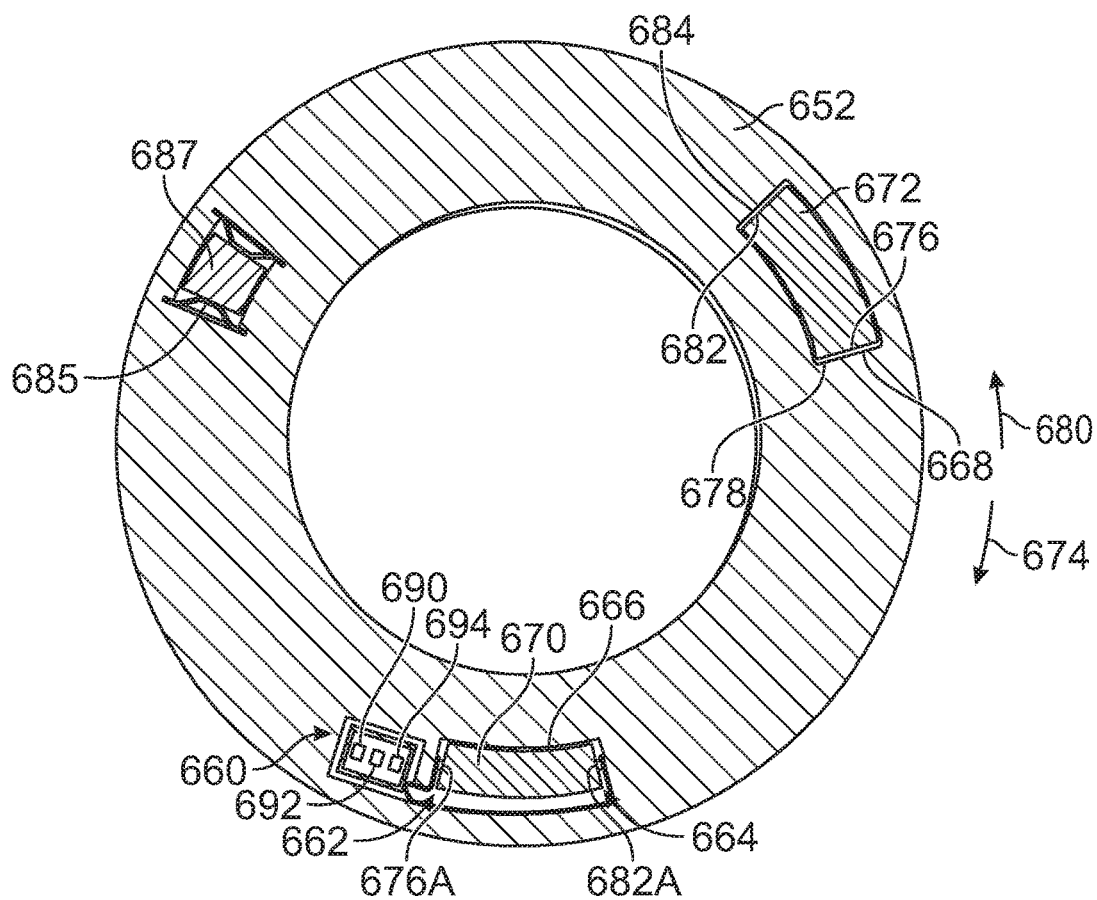
FIG. 51 is a cross-sectional view taken across line 51-51 in FIG. 50 showing a first switch that is closed in response to turning of the nut head in a first direction relative to the threaded body and a second switch that is closed in response to turning of the nut head in an opposite, second direction relative to the threaded body.

Regarding FIGS. 50 and 51, a fastening apparatus such as a nut 650 is provided that is similar in many respects to the locking nuts discussed above such that differences will be highlighted. The nut 650 includes a rotary engagement member, such as a threaded body 652, and an actuator having a rotary drive structure such as a nut head 654. In another embodiment, the rotary engagement member may have a non-threaded configuration, such as including a portion of a bayonet connection, one or more detents, and/or one or more recesses. The threaded body 652 has an opening 656 to receive a spindle or other shaft and threads 658 to engage threads thereon. The threaded body 652 and nut head 654 are rotatably coupled such that there is a limited amount of rotational movement or play between the nut head 654 and the threaded body 652. The nut 650 utilizes this relative rotational movement to operate a fastener device, such as generating a signal indicating turning of the nut head 654.

More specifically, the nut 650 includes circuitry 660 supported by the threaded body 652 and including at least one sensor such as switches 662, 664. The threaded body 652 includes a first opening 666 and a second opening 668 that receive drive tabs 670, 672 of the nut head 654. Thus, turning of the nut head 654 in a tightening direction 674 brings a surface 676 of the driving tab 672 into contact with a surface 678 of the threaded body 652 and permits the driving tab 672 to turn the threaded body 652 in direction 674. Conversely, turning the nut head 654 in a loosening direction 680 abuts a surface 682 of the driving tab 672 against a surface 684 of the threaded body 652. This causes turning of the threaded body 652 in loosening direction 680. The nut 650 includes one or more biasing members such as springs 685 that apply a bias force against a portion 687 of the nut head 654 to return the nut head 654 to an initial position once the turning force is released from the nut head 654.

Regarding FIG. 51, the drive tab 670 has a surface 682A that contacts and closes the switch 664 with turning of the nut head 654 in loosening direction 680. Conversely, the actuating tab 670 includes surface 676A that contacts and closes the switch 662 when the nut head 654 is turned in tightening direction 674. The circuitry 660 may include a processor 690, a power source 692, and communication circuitry 694. The processor 690 may include, for example, a microprocessor that utilizes instructions stored in a non-transitory memory such as RAM or ROM. An example of a processor 690 includes an ASIC. The power source 692 may include a battery and/or an inductive generator as some examples. The communication circuitry 694 is configured to communicate a signal indicative of turning of the nut head 654 relative to the threaded body 652 based on closure of the switches 662, 664. The signal may be communicated via wired or wireless approaches, such as Bluetooth and cellular protocols. The signal may be received by a remote device, such as a user device, an end vehicle device, and/or a server computer to detect that the nut 650 was tightened down onto a threaded shaft and placed into service, as one example.

Further, the processor 690 may be configured to cause the communication circuitry 694 to communicate a signal indicating a rotational direction of the nut head 654 relative to the threaded body 652. For example, if the nut head 654 is turned in tightening direction 674, the actuating tab 670 closes the switch 662 which is detected by the processor 690. The processor 690 may then cause the communication circuitry 694 to communicate a signal indicative of the nut head 654 being turned in the tightening direction 674. As another example, the processor 690 may cause the communication circuitry 694 to communicate a signal indicative of the nut head 654 being turned in the loosening direction 680 if the switch 664 is closed by the actuating tab 670. The information regarding the nut head 654 being turned in loosening direction 680 may be used to create a notification to a driver and/or a fleet manager that the nut 650 has been removed from the shaft or has been loosened so that the driver and/or fleet manager may schedule a check of the nut 650 or a maintenance system may autonomously schedule a check of the nut 650 as some examples.

The nut 650 may be modified for different applications. For example, the relative movement between the nut head 654 and the threaded body 652 may include, for example, at least one of the threaded body 652 remaining stationary and the nut head 654 turning relative to the threaded body 652; the threaded body 652 turning and the nut head 654 remaining stationary; and both of the threaded body 652 and the nut head 654 turning.

Figure 52:
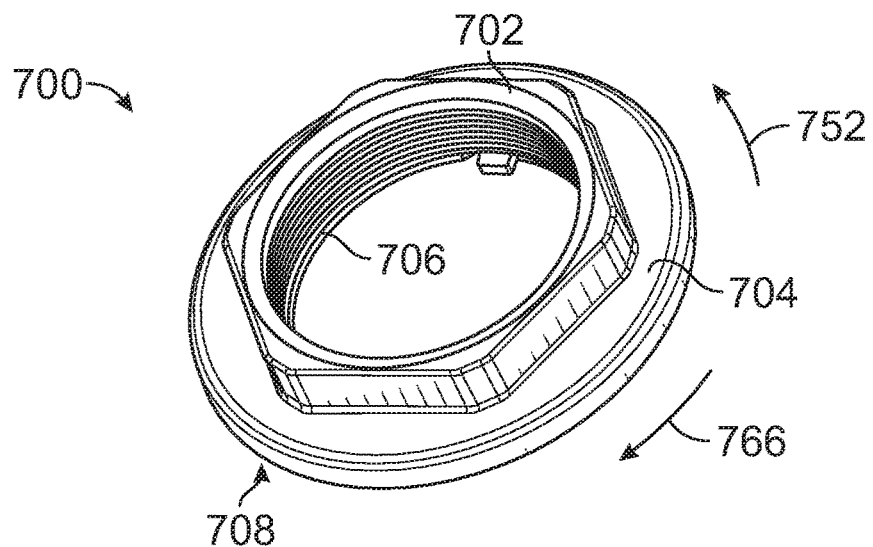
FIG. 52 is a perspective view of a lock nut having a threaded body, a nut head, and a washer.
Figure 53:
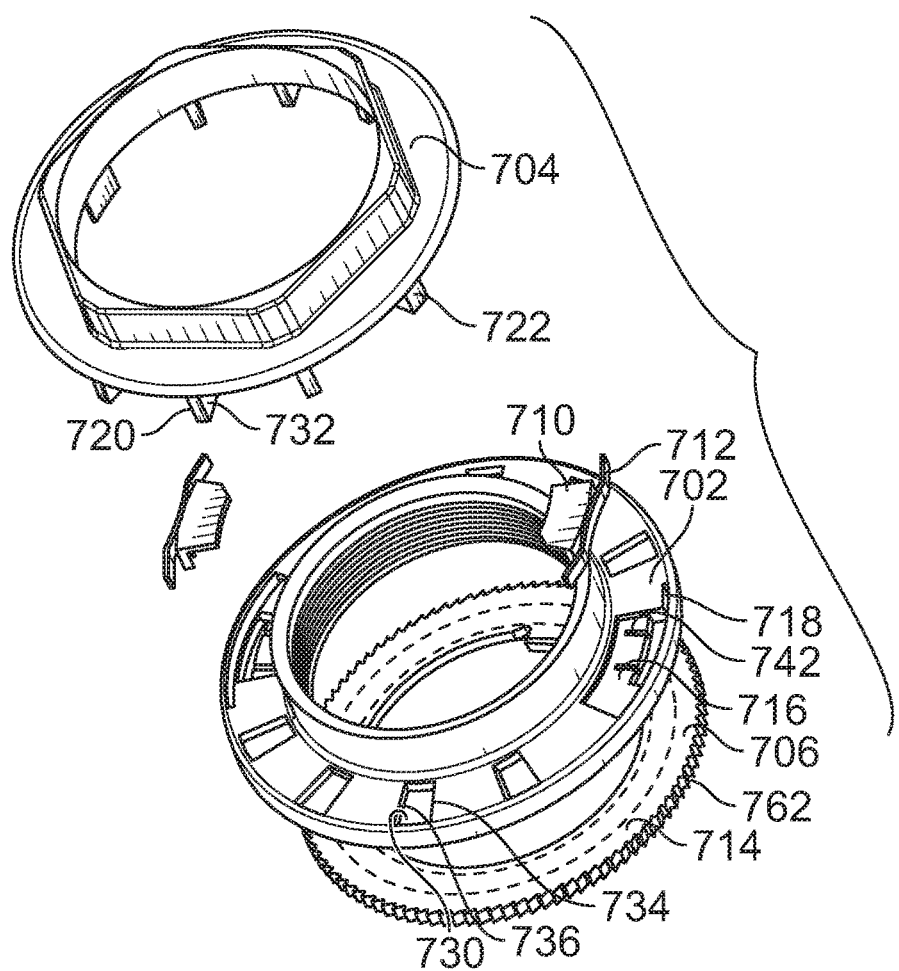
FIG. 53 is an exploded view of the lock nut of FIG. 52 showing pawls and springs that are received in recesses of the threaded body.

Regarding FIGS. 52 and 53, a lock nut 700 is provided that is similar in many respects to the lock nuts discussed above such that differences will be highlighted. The lock nut 700 includes a threaded body 702, a nut head 704, a washer 706, and one or more spring locks 708. The washer 706 has a key that engages a keyway of a spindle to inhibit rotation of the washer 706 around the spindle.

Regarding FIG. 53, the one or more spring locks 708 include locking members such as pawls 710, biasing members such as leaf springs 712, and a gear wheel portion 714 of the washer 706. Each pawl 710 is received in a recess 716 of the threaded body 702 and the leaf springs 712 have ends thereof that are received in channels 718 of the threaded body 702. The nut head 704 includes driving tabs 720 and actuating tabs 722. Regarding FIGS. 54 and 55, each actuating tab 722 includes a cam portion, such as a ramp surface 724, that engages an inclined surface 726 of an associated pawl 710 to shift the pawl 710 radially outward. The driving tabs 720 of the nut head 704 are received in recesses 730 of the threaded body 702. Each driving tab 720 has side surfaces 732 that contact walls 734, 736 of the associated recess 730 to transfer turning of the nut head 704 into turning of the threaded body 702.

Figure 54:
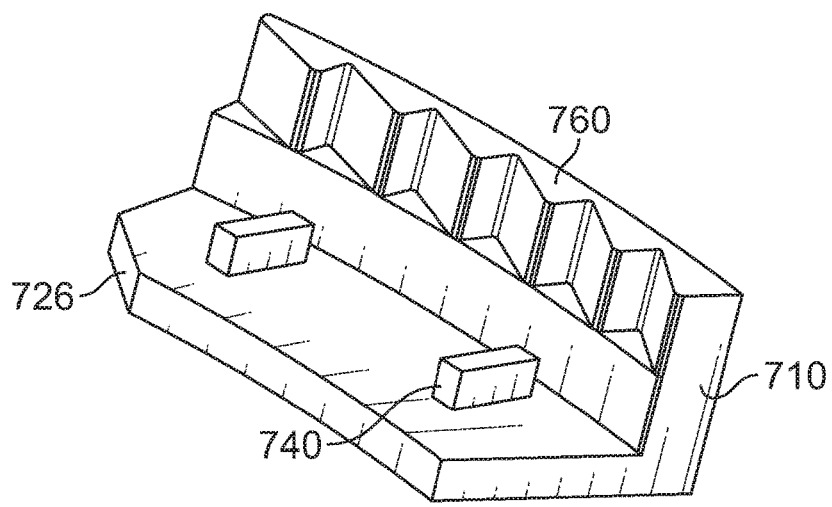
FIG. 54 is a perspective view of the underside of the one of the pawls showing teeth that engage teeth of the washer to inhibit unintended turning of the threaded body in a loosening direction relative to the washer.
Figure 55:
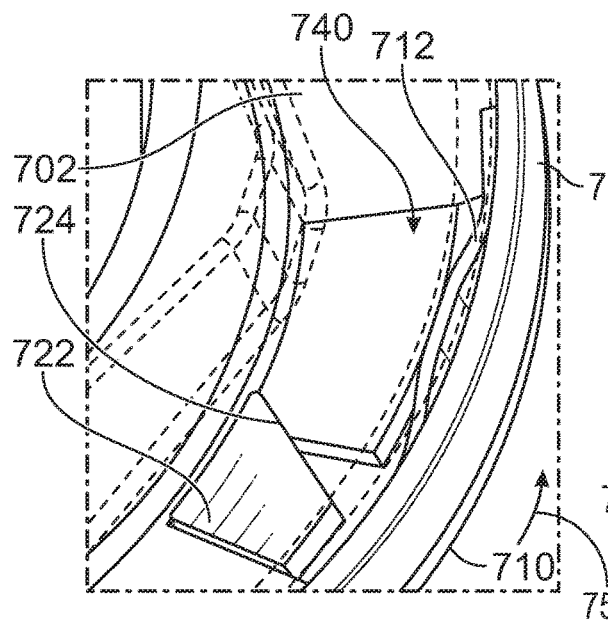
FIG. 55 is a perspective view of an actuating tab of the nut head received in one of the recesses of the threaded body and the associated pawl in a locked position in the one recess.

Regarding FIGS. 53 and 54, the pawl 710 has one or more alignment members, such as slide rails 740, that are radially extending and received in guide slots 742 in the recess 716. The sliding engagement between the slide rails 740 and the guide slots 742 guides the pawl 710 in a radially outward direction 750 when the nut head 704 is turned in loosening direction 752 and guide the pawl 710 in a radially inward direction 754 when the nut head 704 is released. Further, the leaf springs 712 urge the pawls 710 away from an annular wall 756 of the threaded body 702 to return the pawls 710, the actuating tab 722 of the nut head 704, and the nut head 704 itself to an initial position associated with locking of the spring locks 708 when the nut head 704 is released by the user. This ensures the spring locks 708 automatically lock once the user stops applying torque to the nut head 704 with a tool.

Figure 56:
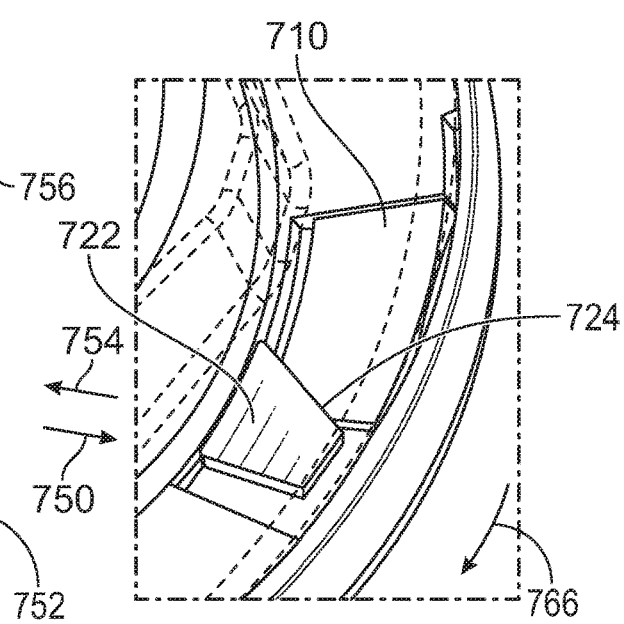
FIG. 56 is a view similar to FIG. 55 showing the nut head actuating tab turned in a counterclockwise loosening direction and shifting the pawl radially outward to an unlocked position wherein the teeth thereof are disengaged from the teeth of the washer.

In the initial position of the nut head 704, the pawl 710 has teeth 760 (see FIG. 54) that intermesh with teeth 762 (see FIG. 53) of the gear wheel portion 714 of the washer 706. When the nut head 704 is turned in a tightening direction 766, the driving tabs 720 of the nut head 704 turn the threaded body 702 and pawls 710 and leaf springs 712 carried therein in tightening direction 766 with the teeth 760 of the pawls 710 ratcheting over the teeth 762 of the washer 706. Conversely, when the nut head 704 is turned in the loosening direction 752, the camming action between the actuating tabs 722 and the pawls 710 disengage the teeth 760 of the pawls 710 from the teeth 762 of the washer 706 so that the teeth 760 are radially outward and in clearance with the teeth 762. With the pawl 710 disengaged from the gear wheel portion 714 as shown in FIG. 56, the user's turning of the nut head 704 in loosening direction 752 causes the driving tabs 720 of the nut head 704 to turn the threaded body 702 and pawls 710 and leaf springs 712 therein in loosening direction 752.

Figure 57:
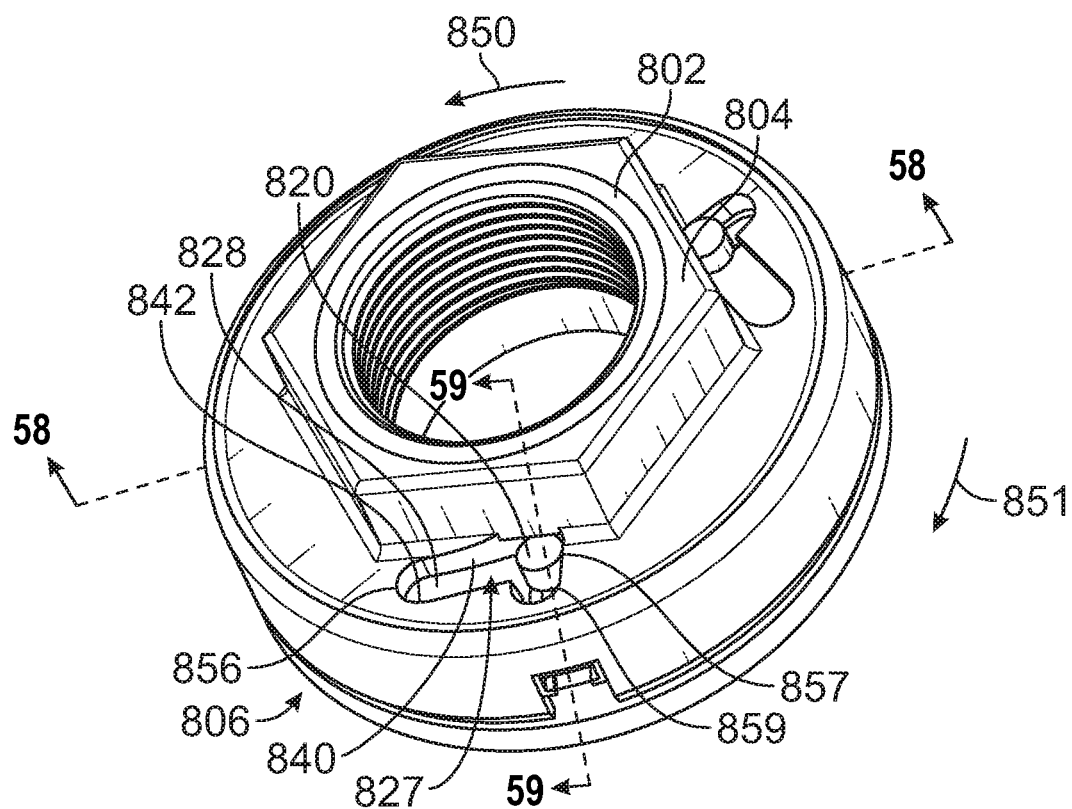
FIG. 57 is a perspective view of a lock nut having a threaded body, a nut head, and a washer.

Regarding FIG. 57, a lock nut 800 is provided that is similar in many respects to the lock nuts discussed above such that differences will be highlighted. The lock nut includes a threaded body 802, a nut head 804, one or more spring locks 806, and a washer 808. The spring locks 806 may sequentially lock and unlock with turning of the threaded body 802 relative to the washer 808 so that one spring lock 806 may always be locked to inhibit loosening of the threaded body 802. The washer 808 has a key including a flat 809 that engages a flat of a spindle to inhibit turning of the washer 808 around the spindle.

The one or more spring locks 806 include a pawl 810 connected to a biasing member such as a leaf spring 812 secured at opposite ends thereof via mounts 814 to an annular wall 816 of the threaded body 802. The pawls 810 are connected to pins 820 via a connecting member such as a cotter pin 822. The pawls 810 ride in rails 824 of the threaded body 802 and each pin 820 has a head 826 (see FIG. 59) that rides in a slot 827 including an angled slot portion 828 of the nut head 804.

Figure 58:
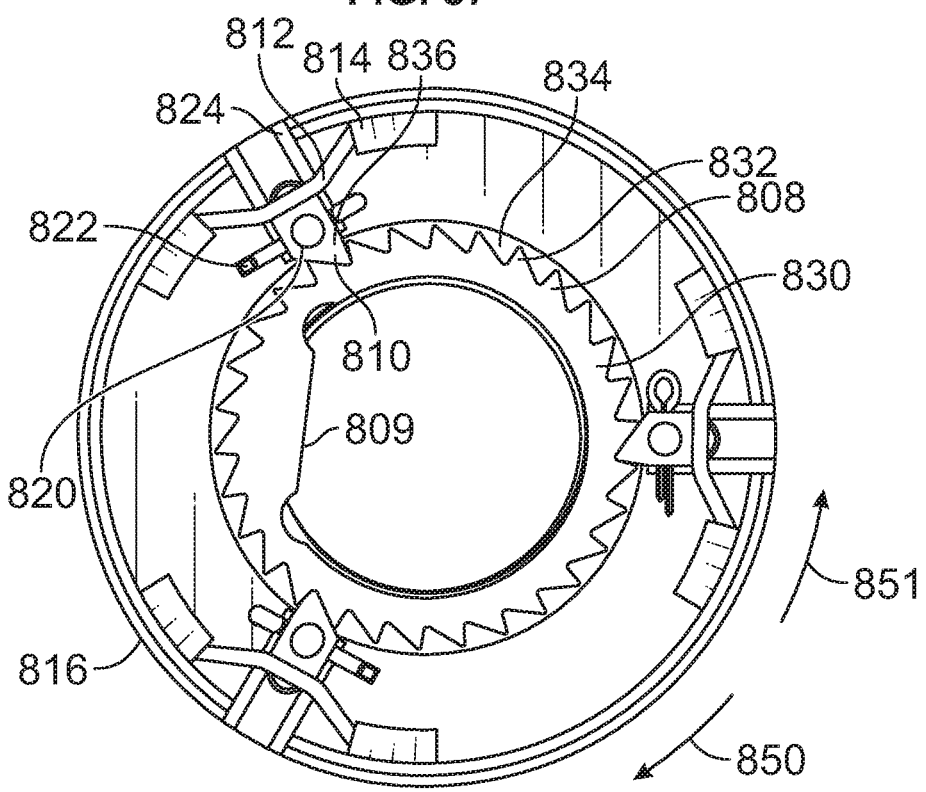
FIG. 58 is a cross-sectional view taken across line 58-58 in FIG. 57 showing pawls slidably mounted within the threaded body and engaged with teeth of the washer.

Regarding FIG. 58, the washer 808 has a gear wheel 830 with teeth 832 and recesses 834. The pawl 810 includes a tip 836 that is received in one of the recesses 834 and engages the teeth 832. Regarding FIGS. 57 and 58, turning the nut head 804 in tightening direction 851 causes ends 857 of the slots 827 to contact the heads 826 of the pins 820 and makes the pins 820 turn the threaded body 802 in tightening direction 851 relative to the washer 808. As the threaded body 802 turns in tightening direction 851 relative to the washer 808, each pawl 810 ratchets over the teeth 832 with the associated pin 820 shifting radially outward into a radial slot portion 859 of the slot 827 as the pawl 810 is cammed outwardly by the ramp surface of a tooth 832 and shifting radially inward out of the radial slot portion 859 once the pawl 810 advances past the peak of the tooth 832.

Figures 60, 61:
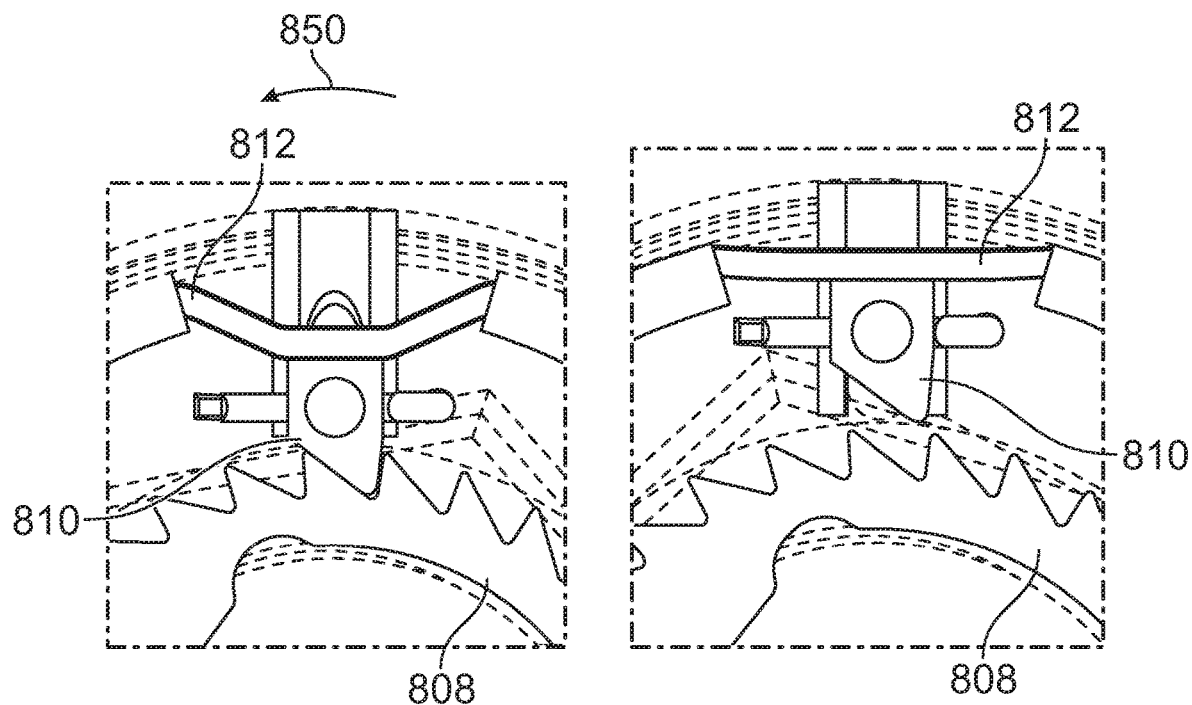
FIG. 60 is a cross-sectional view of one of the pawls in a locked position and engaged with teeth of the washer.
FIG. 61 is a view similar to FIG. 60 showing the pawl having shifted to a radially outward, unlocked position in clearance with the teeth of the washer.

Regarding FIGS. 57, 60 and 61, the angled slot 828 of the nut head 804 includes ramp walls 840, 842 for contacting the head 826 of the pin 820. Upon turning of the nut head 804 in a loosening direction 850, the ramp walls 840, 842 cooperate to cam the pin 820 radially outward and shift the associated pawl 810 radially outward from an engaged position (see FIG. 60) to a disengaged position (see FIG. 61). With the pawls 810 disengaged from the washer 808, turning of the nut head 804 in loosening direction 850 causes ends 856 of the slots 828 to contact the pins 820 and make the pins 820 turn the threaded body 802.

Figure 59:
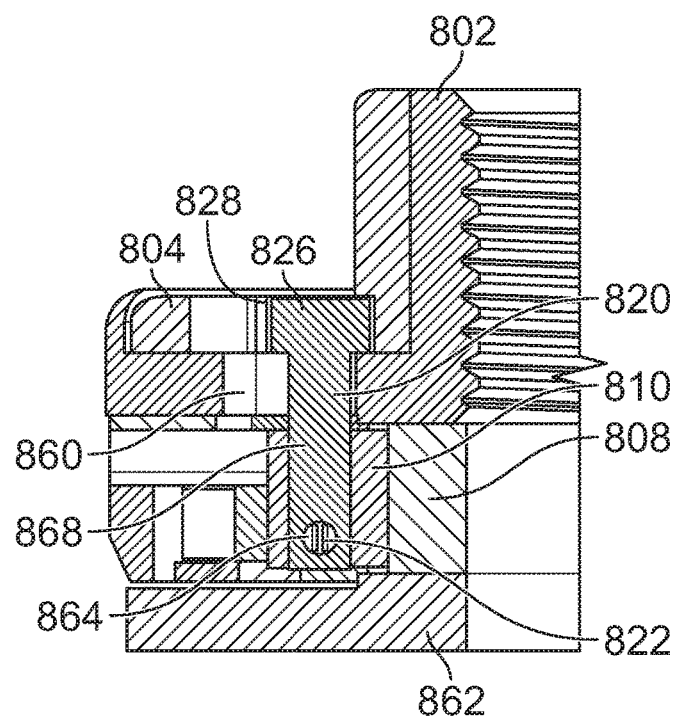
FIG. 59 is a cross-sectional view taken across line 59-59 in FIG. 57 showing one of the pawls connected to a pin that rides in an angled slot of the nut head so that turning of the nut head cams the pin radially outward and disengages the pawl from the washer.

Regarding FIG. 59, the pin 820 extends through an opening 860 in the threaded body 802 that is elongated in the radial direction to provide clearance for the pin 820 to be cammed radially outward by the angled slot 828. The lock nut 800 may further include a washer 862 to cover the underside of the threaded body 802. In one embodiment, the pin 820 is connected to the pawl 810 by the cotter pin 822 extending through an opening 864 in a shank 868 of the pin 820.

Figure 62:
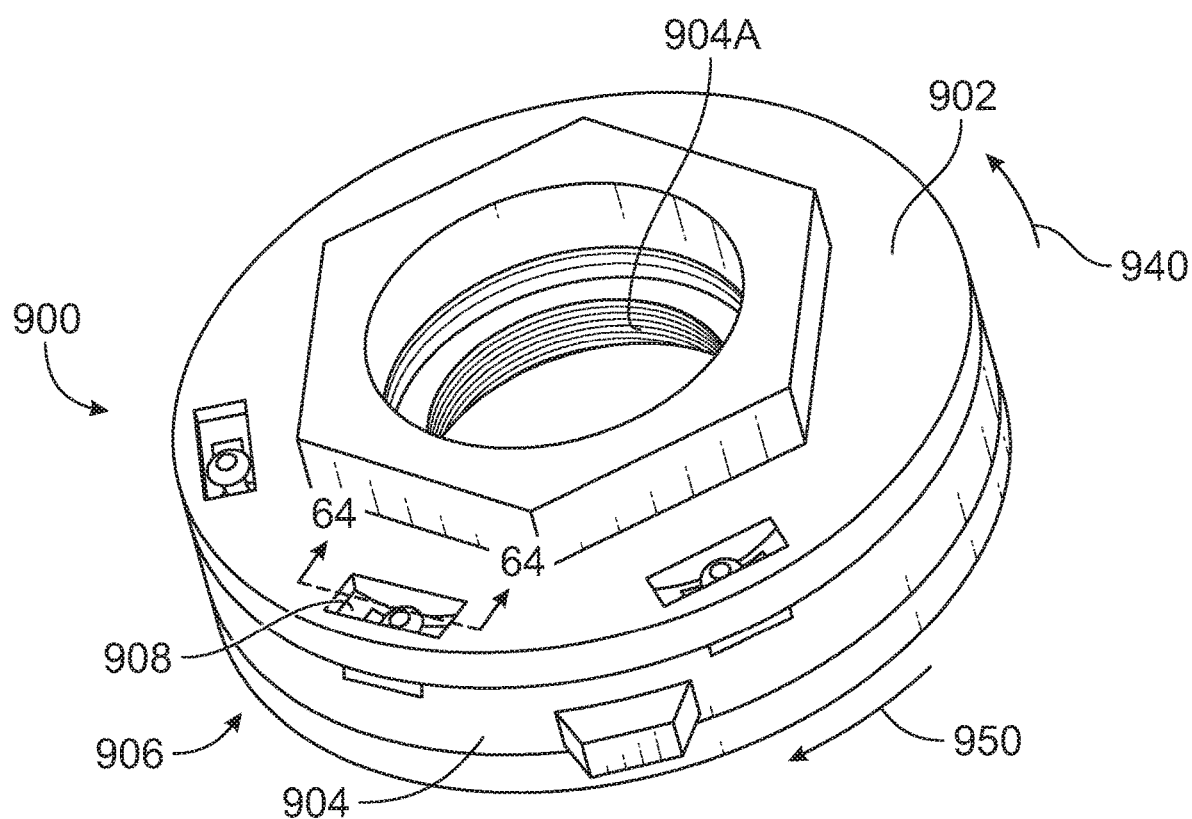
FIG. 62 is a perspective view of a lock nut having a nut head and a threaded body with a central opening to receive a spindle or other shaft.
Figure 63:
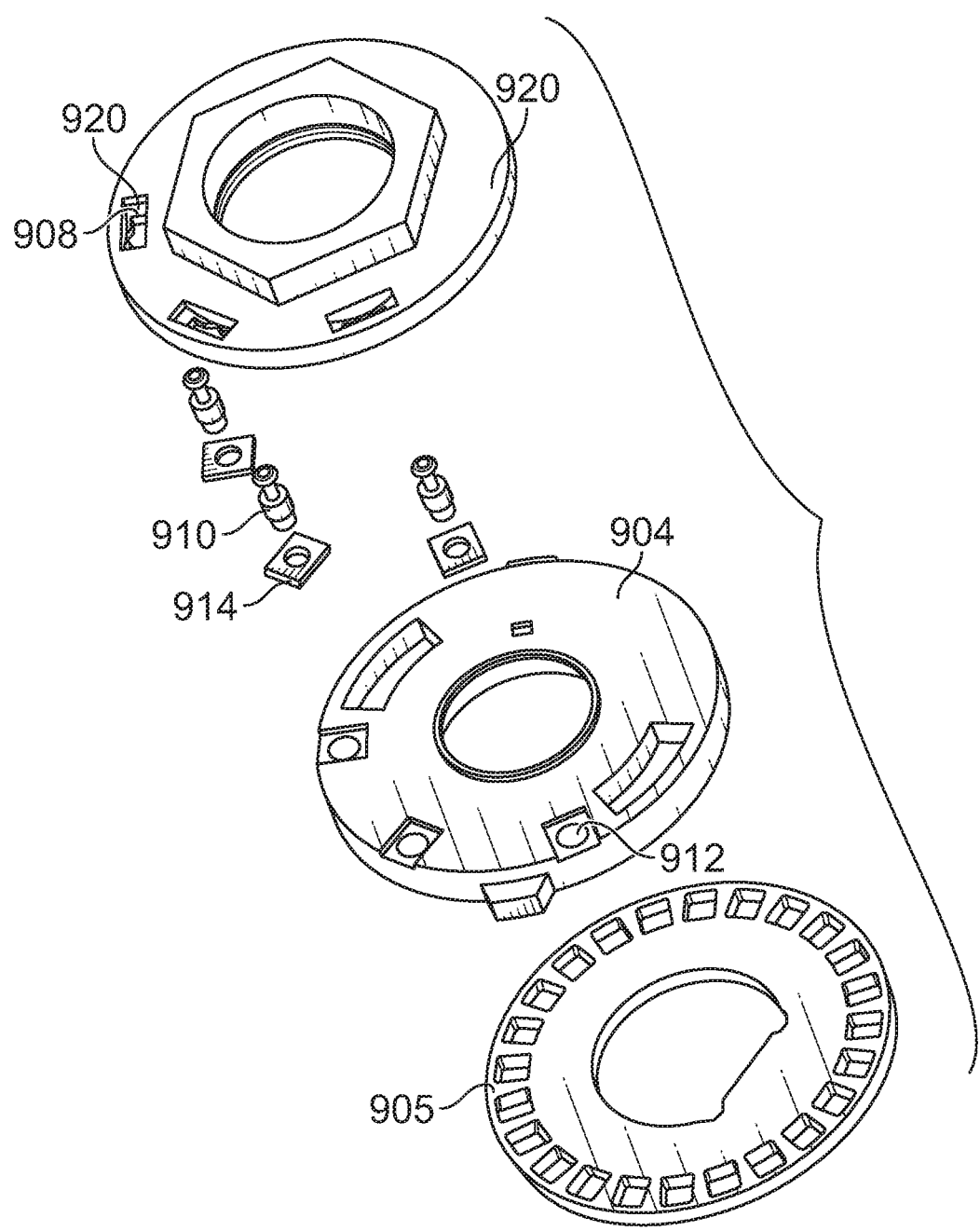
FIG. 63 is an exploded view of the lock nut of FIG. 62 showing pins of the lock nut having plunger portions that are received in through holes of the threaded body.
Figure 64:
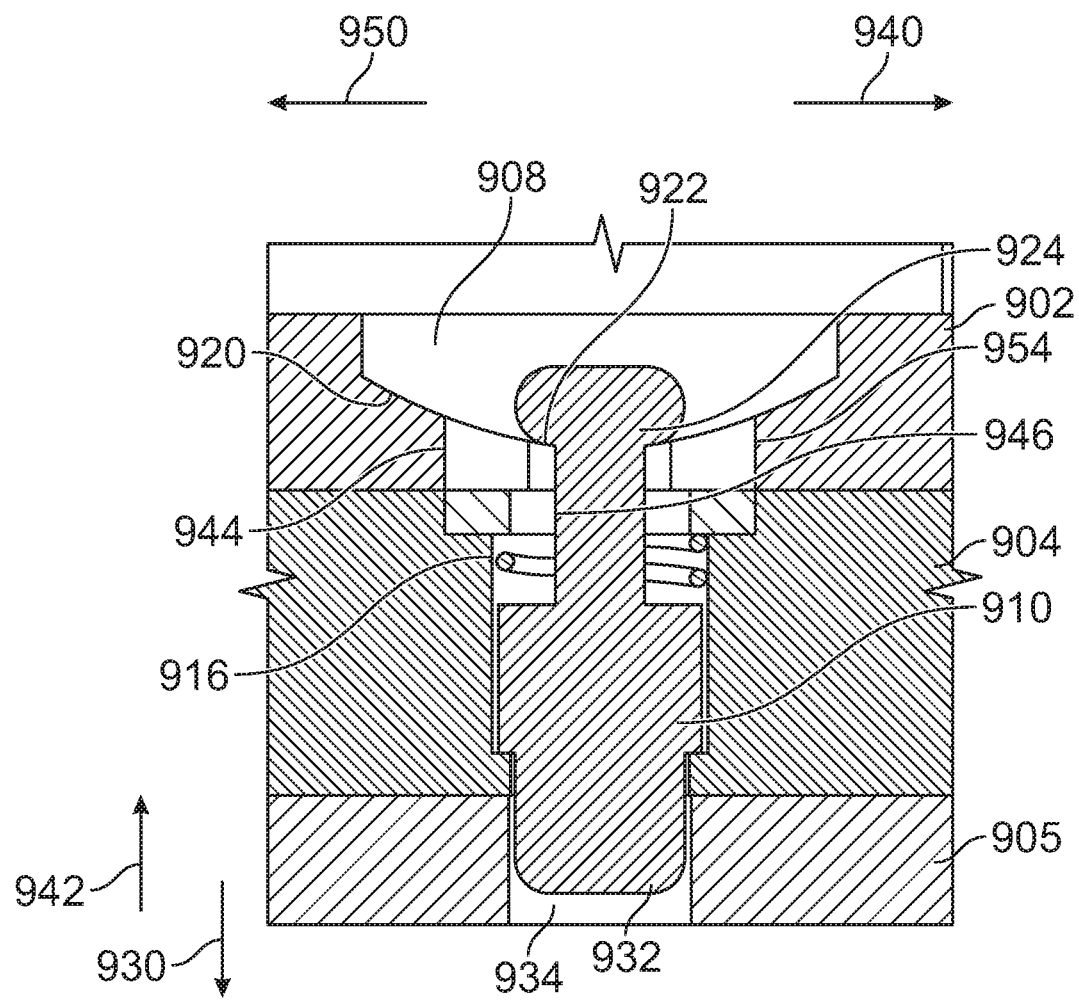
FIG. 64 is a cross-sectional view taken across line 64-64 in FIG. 62 showing a ramp surface of the nut head that contacts a head of one of the pins with turning of the nut head to shift the pin upward and disengage the plunger portion thereof from an opening of a washer.

Regarding FIGS. 62-64, a lock nut 900 is shown that is similar in many respects to the lock nuts discussed above such that differences will be highlighted. The lock nut 900 includes a nut head 902, a body 904, and a washer 905. The body 904 may have threads 904A configured to engage threads of a shaft. The washer 905 may have a key that engages a keyway of a shaft as one example. In another embodiment, the washer 905 may be omitted and pins 910 of the lock nut 900 engage another component such as recesses of a housing to fix the body 904 against rotation.

The lock nut 900 includes one or more locks 906 that each include a pocket 908 of the nut head 902, a lock member such as a pin 910, a through hole 912 of the body 904, a spring seat such as a plate 914, and a spring 916. Regarding FIG. 64, each pocket 908 includes a cam portion, such as a ramp surface 920, configured to engage a lower surface 922 of a head 924 of the pin 910. The spring 916 biases the pin 910 in direction 930 so that a locking portion, such as a plunger 932, of the pin 910 extends into an opening 934 of the washer 905. To permit turning of the threaded body 904 relative to the washer 905, the nut head 902 is turned in loosening direction 940 (see FIG. 62) which causes the ramp surface 920 to cammingly engage the pin head 924 and shift the pin 960 upward in direction 942 which withdraws the plunger 932 from the opening 934 of the washer 905. With the pin 910 withdrawn from the washer opening 934, the nut head 902 has a pocket surface 944 configured to contact a neck 946 of the pin 910. The contact between the surface 944 and neck 946 causes the pin 910 to urge the body 904 in the loosening direction 940 and permit the threaded body 904 to be advanced in an outboard direction along the elongated threaded shaft. Conversely, turning the nut head 902 in a tightening direction 950 cams the head 924 upward and brings a surface 954 into contact with the pin neck 946 such that the pin 910 causes corresponding turning of the threaded body 904 in the tightening direction 950. In this manner, the turning of the nut head 902 in direction 940 or 950 both shifts the pins 910 to an unlocked position and causes corresponding turning of the threaded body 904 to advance or withdraw the lock nut 900 along the threaded shaft.

The pins 910 of the lock nut 900 lock the threaded body 904 in both the loosening and tightening directions relative to the washer 905. The nut head 902 is turned to unlock the pins 910 before the threaded body 904 will turn relative to the washer 905.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass only A, only B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims. For example, the lock nuts 22, 350 may be reconfigured so that the locking mechanisms thereof resist tightening of the respective threaded body, rather than resisting loosening of the threaded body, until the nut head is operated to disengage the locking mechanism.

What is claimed is:

1. A lock nut for a vehicle spindle, the lock nut comprising:
   a washer, a threaded body, and an actuator that are distinct from one another;
   the washer having an opening sized to receive the vehicle spindle, the washer configured to form a non-rotatable connection with the vehicle spindle;

the threaded body having threads to engage threads of the vehicle spindle;

the actuator having a rotary drive structure, the actuator configured to be turned in a tightening direction to cause turning of the threaded body in the tightening direction relative to the washer;

a lock operably coupled to the actuator and configured to inhibit turning of the threaded body in a loosening direction relative to the washer;

wherein the lock includes a locking member distinct from the washer, the threaded body, and the actuator;

the locking member having a locked position wherein the locking member engages at least one of the washer and the threaded body to inhibit turning of the threaded body in the loosening direction relative to the washer and an unlocked position wherein the locking member is less engaged with the at least one of the washer and the threaded body to permit turning of the threaded body in the loosening direction; and the actuator configured to be turned relative to the threaded body in the loosening direction to shift the locking member from the locked position to the unlocked position and turn the threaded body in the loosening direction relative to the washer.

2. The lock nut of claim 1 wherein the locking member includes a plurality of rollers and the lock includes surfaces of the threaded body and the washer, the rollers in the locked positions thereof being wedged between the surfaces to inhibit turning of the threaded body in the loosening direction relative to the washer.

3. The lock nut of claim 1 wherein the locking member includes at least one spring pawl that engages at least one tooth of the washer with the spring pawl in the locked position to inhibit turning of the threaded body in the loosening direction relative to the washer.

4. The lock nut of claim 1 further comprising at least one spring configured to apply a bias force against the actuator to re-engage the lock in response to turning of the actuator in the loosening direction relative to the threaded body.

5. The lock nut of claim 1 wherein the lock includes a spring ring secured to one of the threaded body and the washer, the spring ring having at least one resilient member urging the locking member into engagement with the other of the washer and the threaded body.

6. The lock nut of claim 1 wherein the actuator and the threaded body have a first pair of drive surfaces that cooperate to cause turning of the threaded body relative to the washer with turning of the actuator in the tightening direction and a second pair of drive surfaces that cooperate to cause turning of the threaded body relative to the washer with turning of the actuator in the loosening direction.

7. The lock nut of claim 6 wherein the first and second pairs of drive surfaces are arranged to permit the actuator to turn relative to the threaded body through a predetermined rotary range of motion.

8. The lock nut of claim 1 further comprising a resilient retainer connected to the washer that keeps the threaded body and actuator assembled with the washer.

9. The lock nut of claim 1 wherein the locking member comprises a plurality of locking members.

10. The lock nut of claim 1 wherein the lock includes a ring and the locking member comprises a plurality of pawls of the ring.

11. The lock nut of claim 1 wherein the locking member engages the washer with the locking member in the locked position; and wherein the locking member is less engaged with the washer with the locking member in the unlocked position.

12. The lock nut of claim 1 wherein the locking member is engaged with both the washer and the threaded body with the locking member in the locked position; and wherein the locking member is not engaged with one of the washer and the threaded body with the locking member in the unlocked position.

13. The lock nut of claim 1 wherein the locking member is clamped between the washer and the threaded body with the locking member in the locked position; and wherein the locking member is not clamped between the washer and the threaded body with the locking member in the unlocked position.

14. A wheel hub assembly including:

a wheel hub;

bearings mounted in the wheel hub and configured to receive a vehicle spindle;

a nut assembly having a central axis, the nut assembly comprising:

a base configured to form a non-rotatable connection with the vehicle spindle;

a threaded body having threads to rotatably engage threads of the vehicle spindle;

an actuator having a rotary drive structure;

the base, threaded body, and actuator having fixed positions along the central axis of the nut assembly;

drive portions of the actuator and threaded body that cooperate to cause turning of the threaded body about the central axis relative to the base with turning of the actuator in a tightening direction about the central axis relative to the base while the base, threaded body, and actuator have the fixed positions thereof along the central axis of the nut assembly as the threaded body turns with the actuator;

the drive portions of the actuator and threaded body permitting rotary movement of the actuator in a loosening direction relative to the threaded body with a predetermined range of rotary motion while the base, threaded body, and actuator have the fixed positions thereof along the central axis;

the drive portions of the actuator and the threaded body configured to engage and cause turning of the threaded body in the loosening direction upon the actuator being turned relative to the threaded body in the loosening direction through the predetermined range of rotary motion while the base, threaded body, and actuator have the fixed positions thereof along the central axis; and a wheel end device coupled to at least one of the actuator and the threaded body, the wheel end device configured to operate in response to the relative rotary movement of the actuator and the threaded body.

15. The wheel hub assembly of claim 14 wherein the base is annular; and wherein the wheel end device includes a freewheel clutch that is disengaged in response to turning rotary movement of the actuator in the loosening direction relative to the threaded body.

16. The wheel hub assembly of claim 14 wherein the threaded body is configured to engage threads of the vehicle spindle;

the base having a through opening for receiving the spindle; and wherein the wheel end device includes a lock operably coupled to the actuator, the lock configured to shift from a locked configuration that inhibits turning of the threaded body in the loosening direction relative to the base to an unlocked configuration that permits turning of the threaded body in the loosening direction relative to the base in response to the actuator being turned in the loosening direction relative to the threaded body through the predetermined range of rotary motion.

17. The wheel hub assembly of claim 14 further comprising at least one spring configured to apply a bias force against the actuator in response to the actuator being turned in the loosening direction relative to the threaded body.

18. The wheel hub assembly of claim 17 wherein the at least one spring is configured to apply a bias force against the actuator in response to the actuator being turned in the tightening direction relative to the threaded body.

19. The wheel hub assembly of claim 14 wherein the wheel end device includes at least one sensor configured to detect the relative rotary movement of the actuator and the threaded body.

20. The wheel hub assembly of claim 19 wherein the wheel end device includes a processor and communication circuitry operably coupled to the at least one sensor, the processor configured to cause the communication circuitry to send a signal to a remote device upon the sensor detecting the relative rotary movement of the actuator and the threaded body.

21. The wheel hub assembly of claim 19 wherein the at least one sensor is configured to detect relative rotary movement of the actuator and the threaded body in the loosening direction and in the tightening direction opposite the first direction; and
a processor operably coupled to the at least one sensor and configured to determine whether the relative movement of the actuator and threaded body is in the loosening direction or the tightening direction.

22. The wheel hub assembly of claim 14 wherein the base, threaded body, and actuator are constrained to rotary motion relative to one another.

23. The wheel hub assembly of claim 14 wherein the base, threaded body, and actuator have portions overlapping in an axial direction along the central axis; and
wherein the nut assembly includes a retainer keeping the actuator and threaded body assembled with the base.

24. A method of operating a lock nut comprising a washer non-rotatably connected to a vehicle spindle, a threaded body having threads engaged with threads of the spindle, an actuator, and a lock having a locking member that is distinct from the washer, the threaded body, and the actuator, wherein the actuator is configured to be turned in a loosening direction relative to the threaded body to disengage the lock of the lock nut that inhibits turning of the threaded body in the loosening direction relative to the washer, the method comprising:
connecting a tool to a rotary drive structure of the actuator; and
turning the actuator in the loosening direction to cause turning of the threaded body in the loosening direction relative to the washer;
wherein turning the actuator in the loosening direction includes turning the actuator in the loosening direction relative to the threaded body and shifting the locking member of the lock from a locked position wherein the locking member engages at least one of the threaded body and the washer and inhibits turning of the threaded body in the loosening direction relative to the washer to an unlocked position wherein the locking member is disengaged from the at least one of the threaded body and the washer and the locking member permits turning of the threaded body in the loosening direction relative to the washer.

25. The method of claim 24 wherein turning the actuator in the loosening direction comprises using the tool connected to the rotary drive structure of the actuator.

26. The method of claim 24 further comprising turning the actuator in a tightening direction to turn the actuator in the tightening direction relative to the threaded body; and
detecting the turning of the actuator in the tightening direction relative to the threaded body via a sensor of the lock nut.

27. The method of claim 24 further comprising turning the actuator in a tightening direction to cause turning of the threaded body in the tightening direction relative to the washer.

28. A fastener assembly comprising:
a rotary engagement member having a central through opening to receive a shaft;
an actuator connected to the rotary engagement member and having a rotary drive structure;
drive portions of the actuator and rotary engagement member that cooperate to cause turning of the rotary engagement member with turning of the actuator;
the drive portions of the actuator and rotary engagement member permitting relative rotary movement of the actuator and the rotary engagement member in a first rotary direction and a second rotary direction opposite the first rotary direction;
a fastener device coupled to at least one of the actuator and the rotary engagement member, the fastener device configured to operate in response to the relative rotary movement of the actuator and the rotary engagement member;
wherein the fastener device comprises a sensor configured to:
produce a first signal indicative of the actuator and rotary engagement member moving relative to one another in the first rotary direction; and
produce a second signal indicative of the actuator and the rotary engagement member moving relative to one another in the second rotary direction, and
wherein the sensor comprises:
a first switch configured to close in response to the actuator and the rotary engagement member moving relative to one another in the first rotary direction; and
a second switch configured to close in response to the actuator and the rotary engagement member moving relative to one another in the second rotary direction.

29. The fastener assembly of claim 28 further comprising:
an annular base having a central opening to receive the shaft, the annular base configured to form a non-rotatable connection with the shaft
wherein the fastener device includes a lock operably coupled to the actuator, the lock configured to shift from a locked configuration that inhibits turning of the rotary engagement member in the first rotary direction relative to the annular base to an unlocked configuration that permits turning of the rotary engagement member in the first rotary direction relative to the annular base in response to turning of the actuator in the first rotary direction relative to the rotary engagement member.

30. The fastener assembly of claim 28 wherein the fastener device includes a processor and communication circuitry operably coupled to the sensor, the processor configured to:
- cause the communication circuitry to communicate data representative of the first signal to a remote device upon the sensor detecting relative rotary movement of the actuator and the rotary engagement member in the first rotary direction; and
- cause the communication circuitry to communicate data representative of the second signal to the remote device upon the sensor detecting relative rotary movement of the actuator and the rotary engagement member in the second rotary direction.

31. The fastener assembly of claim 28 wherein the drive portions of the actuator and rotary engagement member include:
- a first pair of surfaces of the actuator and rotary engagement member configured to abut upon the actuator and the rotary engagement member moving relative to one another in the first rotary direction; and
- a second pair of surfaces of the actuator and rotary engagement member configured to abut with the actuator and the rotary engagement member moving relative to one another in the second rotary direction.

32. The fastener assembly of claim 31 wherein the actuator and the rotary engagement member have an initial configuration wherein the first pair of surfaces are spaced apart from one another and the second pair of surfaces are spaced apart from one another.

33. The fastener assembly of claim 32 further comprising a spring configured to bias the actuator and rotary engagement member toward the initial configuration thereof.

* * * * *